United States Patent
Pieczul et al.

(10) Patent No.: US 12,294,585 B2
(45) Date of Patent: *May 6, 2025

(54) TECHNIQUES FOR AUTOMATICALLY CONFIGURING MINIMAL CLOUD SERVICE ACCESS RIGHTS FOR CONTAINER APPLICATIONS

(71) Applicant: Oracle International Corporation, Redwood Shores, CA (US)

(72) Inventors: Olgierd Stanislaw Pieczul, Dublin (IE); Hubert Alexander Foskett, Sammamish, WA (US); Robert Graham Clark, Clyde Hill, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,103

(22) Filed: Mar. 12, 2024

(65) Prior Publication Data
US 2024/0223569 A1 Jul. 4, 2024

Related U.S. Application Data

(63) Continuation of application No. 18/144,947, filed on May 9, 2023, now Pat. No. 11,962,599, which is a
(Continued)

(51) Int. Cl.
*H04L 9/40* (2022.01)
*G06F 9/455* (2018.01)

(52) U.S. Cl.
CPC ............ *H04L 63/104* (2013.01); *H04L 63/08* (2013.01); *H04L 63/20* (2013.01);
(Continued)

(58) Field of Classification Search
CPC ....... H04L 63/08; H04L 63/101; H04L 63/20; H04L 67/10; H04L 63/105; H04L 63/104;
(Continued)

(56) References Cited

U.S. PATENT DOCUMENTS 7,127,461 B1   10/2006   Zhu et al.
11,032,287 B1   6/2021   Wang et al.
(Continued)

FOREIGN PATENT DOCUMENTS

CN   105051715 A   11/2015

OTHER PUBLICATIONS

Chow et al., "SPICE—Simple Privacy-Preserving Identity-Management for Cloud Environment", Springer-Verlag, Applied Cryptography and Network Security, Jun. 2012, pp. 526-543.
(Continued)

*Primary Examiner* — Benjamin A Kaplan
(74) *Attorney, Agent, or Firm* — Invoke

(57) ABSTRACT

A computer system may receive one or more requests for access to one or more cloud services and may store the one or more requests in a request log. The computer system may receive one or more access rules applicable to cloud service access rights. The computer system may aggregate the one or more requests of the request log to determine access requirements for a container, the container being configured to store one or more applications. The computer system may generate and store container access policies that define access of a container and the one or more cloud services, the container access policies based at least in part on the aggregated one or more requests and the one or more access rules. The computer system may send the container access policies to a request forwarder of a compute instance in a production environment.

20 Claims, 12 Drawing Sheets

Related U.S. Application Data continuation of application No. 17/177,159, filed on Feb. 16, 2021, now Pat. No. 11,695,776.

(52) U.S. Cl.
CPC .............. *G06F 9/45558* (2013.01); *G06F 2009/45562* (2013.01); *G06F 2009/45587* (2013.01)

(58) Field of Classification Search
CPC ....... G06F 21/6218; G06F 2009/45587; G06F 2221/2141; G06F 9/45558; G06F 2009/45562
USPC .......................................................... 726/1
See application file for complete search history.

(56) References Cited

U.S. PATENT DOCUMENTS

| | | |
|---|---|---|
| 11,829,792 B1 | 11/2023 | Chandrashekar |
| 2010/0115291 A1 | 5/2010 | Buer |
| 2014/0317701 A1 | 10/2014 | Eicken et al. |
| 2017/0214701 A1 | 7/2017 | Hasan |
| 2017/0228182 A1 | 8/2017 | Novak et al. |
| 2018/0191725 A1 | 7/2018 | Luukkala |
| 2018/0316676 A1 | 11/2018 | Gilpin et al. |
| 2018/0367528 A1 | 12/2018 | Schwarz et al. |
| 2019/0020665 A1 | 1/2019 | Surcouf et al. |
| 2019/0081955 A1 | 3/2019 | Chugtu et al. |
| 2019/0098055 A1 | 3/2019 | Pitre et al. |
| 2020/0097195 A1 | 3/2020 | Fritz et al. |
| 2020/0120102 A1 | 4/2020 | Cybulski et al. |
| 2020/0272712 A1 | 8/2020 | Pintr et al. |
| 2020/0301839 A1 | 9/2020 | Kral et al. |
| 2022/0209939 A1 | 6/2022 | Skuliber et al. |

OTHER PUBLICATIONS

Dissanayaka et al., "A Review of MongoDB and Singularity Container Security in regards to HIPAA Regulations", ACM, UCC Companion: Companion Proceedings of the10th International Conference on Utility and Cloud Computing, Dec. 2017, pp. 91-97.

International Application No. PCT/US2022/015608, International Search Report and Written Opinion mailed on May 4, 2022, 13 pages.

Multifactor Authentication (MFA), IBM Cloud Docs/ App ID, Available Online at: https://cloud.IBM.com/docs/appid?topic=appid-cd-mfa, Sep. 22, 2020, 15 pages.

Surantha et al., "Secure Kubernetes Networking Design Based on Zero Trust Model: A Case Study of Financial Service Enterprise in Indonesia", Springer Link, Innovative Mobile and Internet Services in Ubiquitous Computing, 2020, pp. 348-361.

U.S. Appl. No. 17/143,133, Non-Final Office Action mailed on Jul. 26, 2022, 11 pages.

U.S. Appl. No. 17/177,159 , "Non-Final Office Action", filed Aug. 4, 2022, 13 pages.

U.S. Appl. No. 17/177,159 , "Notice of Allowance", filed Feb. 23, 2023, 9 pages.

Allowed arrangements

Forbidden arrangements

Allowed grouping

TECHNIQUES FOR AUTOMATICALLY CONFIGURING MINIMAL CLOUD SERVICE ACCESS RIGHTS FOR CONTAINER APPLICATIONS

INCORPORATION BY REFERENCE; DISCLAIMER

Each of the following applications are hereby incorporated by reference: application Ser. No. 18/144,947 filed on May 9, 2023; application Ser. No. 17/177,159 filed on Feb. 16, 2021. The applicant hereby rescinds any disclaimer of claims scope in the parent application(s) or the prosecution history thereof and advises the USPTO that the claims in the application may be broader than any claim in the parent application(s).

BACKGROUND

Infrastructure and Platform as a service cloud providers support integrated authentication. In particular, customer workloads, hosted on a cloud provider's infrastructure can authenticate using an identity of compute instances they are hosted on. This model can allow customers to build secure workloads. Without it, a customer would be required to bootstrap their instances, or applications running on them, with credentials each time they are created, and ensure that such credentials are recognized by cloud services.

Customer access rules can restrict access to certain services or customer data by compute instances or nodes to prevent all the containers from having the same level of access to the cloud infrastructure. Existing systems to establish connectivity for cloud services often can use overly permissive rules in which all containers have the same level of access to the cloud infrastructure.

BRIEF SUMMARY

Certain embodiments of the present disclosure can provide methods, systems, and computer-readable storage mediums for managing access to cloud based services. The disclosure describes systems and techniques that mediate requests between containers and the cloud service in order to provide adequate level of access control. The disclosed techniques combine an internal authentication of the cloud orchestrator to identify the container caller and cloud service authentication to authenticate calls made to cloud services. In some examples, individual containers running on the system may not get direct access to the metadata service or instance credential. Instead, the containers may send the requests through a request forwarder component. That component establishes the container identity and verifies that the specific container has the access to communicate with the target service (e.g., the cloud services). The request forwarder component uses the instance credential to authenticate the call to the target service. The compute instance can be configured in a way that prevents containers from accessing the metadata service. The technique effectively prevents processes in containers to use the compute instance credentials. Compute instances are examples of virtual processors, compute nodes in the cloud, or even bare metal processors (e.g., physical hardware computers).

When a container is initialized it can be provided with a credential by the container orchestrator. The container orchestrator can identify the container using the credential in addition to replacing nodes, replacing containers to nodes and so forth. This process can take different forms. In some instances, the process will result in a credential being stored on a container's file system. According to an aspect of the disclosure, a process being executed in a container intends to make a call to a cloud service. The process can direct a request for cloud services to the request forwarder. The request can include the container credential. The request forwarder can receive the request and determine the identity of the container by sending the container credential to the container orchestrator. The request forwarder can consult one or more policies stored on the system to verify that the container is allowed to access the target cloud service. The request forwarder can obtain an instance credential from the metadata service. The request forwarder can send the request to the target cloud service including the compute instance credential. The cloud service can verify the request against one or more stored cloud policies to verify that the instance running in a container is allowed to access the requested cloud service.

Specifically, containers can execute one or more applications that may request access to cloud resources. For example, the resources may be used to create virtual machines, or access sequence or data objects or manage keys in a key management system or store data in a database. Cloud infrastructure systems can include their own integrated access management mechanism. In the access management system, one can grant access to principals. While it is technically possible to just create principals for every container, that technique would need to include granting access to each container. This technique is difficult to replicate at scale because it would require provisioning the credential and dividing those containers. This problem can be solved only using compute nodes. Compute nodes have their own first class identity, and one can grant access to those nodes. Thereby, those machines, as principals, are enabled to perform these kind of actions.

The disclosed techniques allow for isolation of containers, assuming there are two pieces of data that need to be separately stored. For example, one container can store the first piece of data and the second container can store the second piece of data. Ideally, the containers are never hosted on the same machine. In this way, if there is a breach or vulnerability in one container or in container isolation that vulnerability does not provide access to the other data in other containers.

In some aspects, a method includes: receiving one or more requests for access to one or more cloud services; storing the one or more requests in a request log; receiving one or more access rules applicable to cloud service access rights; aggregating the one or more requests of the request log to determine access requirements for a container, the container being configured to store one or more applications; generating container access policies that define access of a container and the one or more cloud services, the container access policies based at least in part on the aggregated one or more requests and the one or more access rules; storing the container access policies in a memory; and sending the container access policies to a request forwarder of a compute instance in a production environment, the request forwarder accessing the container access policies to grant access rights of containers to the one or more cloud services.

In some aspects, generating node access policies, the node access policies specify access policies for granting groups of compute instances a combined access of one or more containers on a node; and storing the container access policies in the memory.

In some aspects, the method includes granting access permissions equal to combined access of the one or more containers assigned to the node.

In some aspects, the method includes partitioning the compute instance with a plurality of compute instances into groups of nodes, each of the nodes having distinct access; and assigning one or more containers to a node with sufficient access based at least in part on the node access policies.

In some aspects, node access is pre-determined and container access within each node is dynamically configured.

In some aspects, the method includes testing access requirements for a cloud system; detecting a failure of a specific application to access the one or more cloud services based at least in part on an entry in the request log; and changing permissions of a compute instance to remedy the failure.

In some aspects, the method includes setting the request forwarder for each container type in the production environment to a permissive mode, the permissive mode granting access of the one or more applications stored in the container to the one or more cloud services; receiving the one or more requests from the request forwarder; and in accordance with a number of the one or more requests exceeding a threshold requirement, switching the request forwarder to a restrictive mode, the restrictive mode granting access of the one or more applications to the one or more cloud services based in part on the container access policies in accordance with a number of the one or more requests exceeding a threshold requirement, switching the request forwarder to a restrictive mode, the restrictive mode granting access of the one or more applications to the one or more cloud services based in part on the container access policies.

In some aspects, a non-transitory computer-readable medium storing a set of instructions for configuring cloud service access rights for container applications includes: one or more instructions that, when executed by one or more processors of a computer system, cause the computer system to: receive one or more requests for access to one or more cloud services; store the one or more requests in a request log; receive one or more access rules applicable to cloud service access rights; aggregate the one or more requests of the request log to determine access requirements for a container, the container being configured to store one or more applications; generate container access policies that define access of a container and the one or more cloud services, the container access policies based at least in part on the aggregated one or more requests and the one or more access rules; store the container access policies in a memory; and send the container access policies to a request forwarder of a compute instance in a production environment, the request forwarder accessing the container access policies to grant access rights of containers to the one or more cloud services.

In some aspects, the one or more instructions further cause the computer system to: generate node access policies, the node access policies specifying access policies for granting groups of compute instances a combined access of one or more containers on a node; and store the container access policies in the memory.

In some aspects, the one or more instructions further cause the computer system to: grant access permissions equal to combined access of the one or more containers assigned to the node.

In some aspects, the one or more instructions further cause the computer system to: partition the compute instance with a plurality of compute instances into groups of nodes, each of the nodes having distinct access; and assign one or more containers to a node with sufficient access based at least in part on the node access policies.

In some aspects, node access is pre-determined and container access within each node is dynamically configured.

In some aspects, the one or more instructions further cause the computer system to: test access requirements for a cloud system; detect a failure of a specific application to access the one or more cloud services based at least in part on an entry in the request log; and change permissions of a compute instance to remedy the failure.

In some aspects, the one or more instructions further cause the computer system to: set the request forwarder for each container type in the production environment to a permissive mode, the permission mode granting access of the one or more applications stored in the container to the one or more cloud services; receive the one or more requests from the request forwarder; and in accordance with a number of the one or more requests exceeding a threshold requirement, switch the request forwarder to a restrictive mode, the restrictive mode granting access of the one or more applications to the one or more cloud services based in part on the container access policies.

In some aspects, a computer system includes: one or more memories; and one or more processors, communicatively coupled to the one or more memories, configured to perform operations for configuring cloud service access rights for container applications, the operations comprising: receiving one or more requests for access to one or more cloud services; storing the one or more requests in a request log; receiving one or more access rules applicable to cloud service access rights; aggregating the one or more requests of the request log to determine access requirements for a container, the container being configured to store one or more applications; generating container access policies that define access of a container and the one or more cloud services, the container access policies based at least in part on the aggregated one or more requests and the one or more access rules; storing the container access policies in a memory; and sending the container access policies to a request forwarder of a compute instance in a production environment, the request forwarder accessing the container access policies to grant access rights of containers to the one or more cloud services.

In some aspects, the one or more processors are further configured to perform operations comprising: generating node access policies, the node access policies specifying access policies for granting groups of compute instances a combined access of one or more containers on a node; and storing the container access policies in the memory.

In some aspects, the one or more processors are further configured to perform operations comprising: granting access permissions equal to combined access of the one or more containers assigned to the node.

In some aspects, the one or more processors are further configured to perform operations comprising: partitioning the compute instance with a plurality of compute instances into groups of nodes, each of the nodes having distinct access; and assigning one or more containers to a node with sufficient access based at least in part on the node access policies.

In some aspects, node access is pre-determined and container access within each node is dynamically configured.

In some aspects, the one or more processors are further configured to perform operations comprising: testing access requirements for a cloud system; detecting a failure of a specific application to access the one or more cloud services based at least in part on an entry in the request log; and changing permissions of a compute instance to remedy the failure.

Reference to the remaining portions of the specification, including the drawings and claims, will realize other features and advantages of disclosed embodiments. Further features and advantages, as well as the structure and operation of various examples of the present disclosure, are described in detail below with respect to the accompanying drawings. In the drawings, like reference numbers can indicate identical or functionally similar elements.

These and other embodiments are described in detail below. For example, other embodiments are directed to systems, devices, and computer readable media associated with methods described herein.

A better understanding of the nature and advantages of embodiments of the present disclosed may be gained with reference to the following detailed description and the accompanying drawings.

DETAILED DESCRIPTION

I. Introduction

Figure 1:
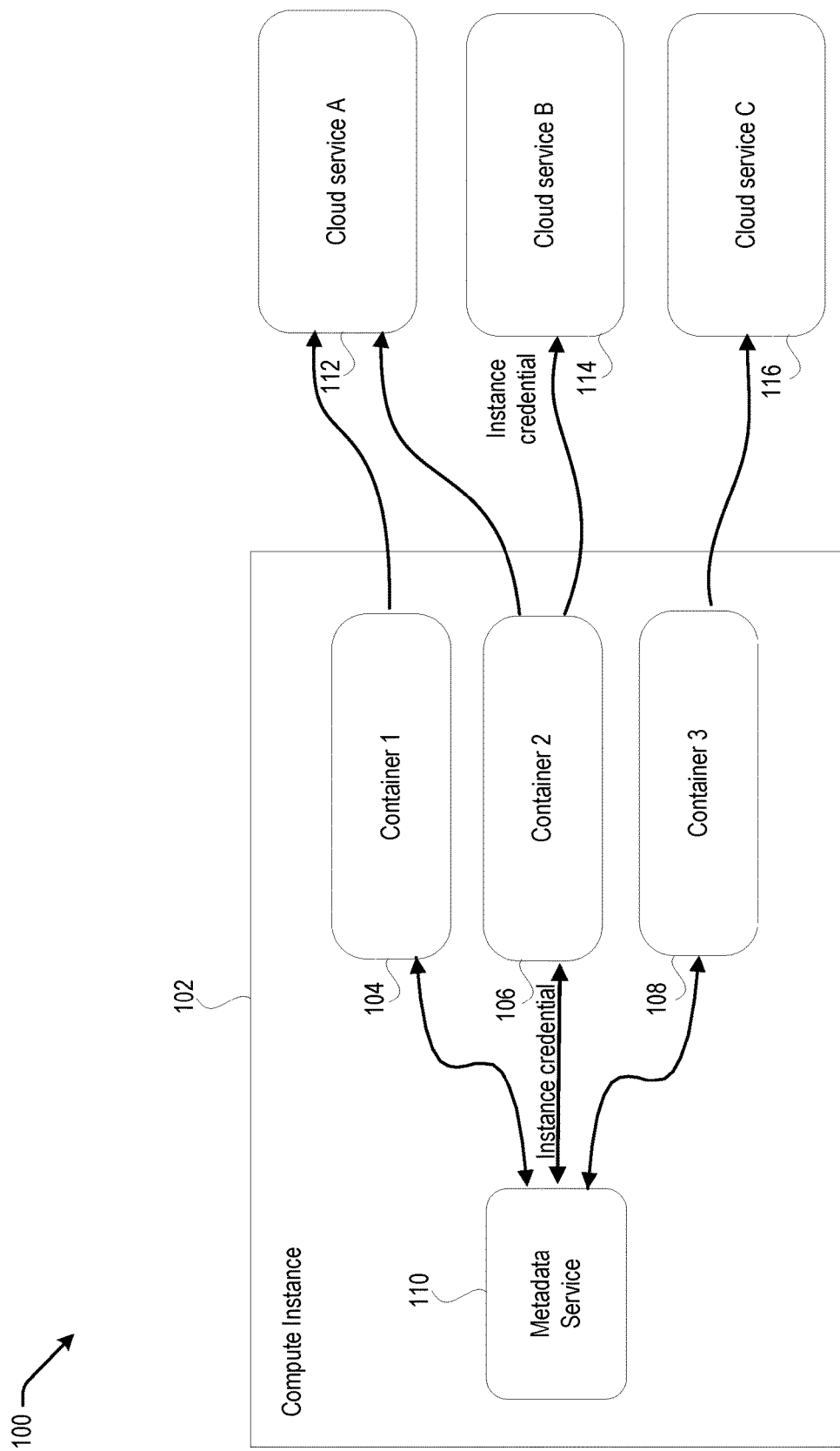
FIG. 1 illustrates a logical construct for an example cloud network architecture.

Modern computing frameworks abstract the concept of a machine. The machine can be considered just a unit of processing. Modern applications are increasingly built using containers, which are micro services packaged with their dependencies and configurations. A container management/clustering service is software for deploying and managing those containers at scale. As applications grow to span multiple containers deployed across multiple servers, operating them becomes more complex. To manage this complexity, a container management/clustering service provides an open source application programming interface (API) that controls how and where those containers will run. Container management/clustering service orchestrates clusters of virtual machines and schedules containers to run on those virtual machines based on their available compute resources and the resource requirements of each container. Containers are grouped into pods, the basic operational unit for container management/clustering service, and those pods scale to the desired state. Container management/clustering service also automatically manages service discovery, incorporates load balancing, tracks resource allocation, scales based on compute utilization, checks the health of individual resources, and enables apps to self-heal by automatically restarting or replicating containers.

A network orchestrator can be used to assign the number of instances for each container. Based on how busy each of the machines are, containers can be added or removed to create high workload density to result in cost savings. Containers can be customized for high input/output (I/O) bandwidth for increased performance.

Cloud providers can issue an identity for each of the compute nodes. In this way, the nodes can have their own identity. There is a standard mechanism of obtaining that identity. So if the container is running a process on the node, the system can call a specific IP address for example. This can return a specific identity ephemeral credential that is associated with that specific instance. That credential would have multiple parameters such as what is a specific machine but also what group of machines that machine belongs to.

In an example, a customer can use two services from the cloud vendor (e.g., compute and object storage). A customer's application runs on compute instances and stores and retrieves data from object storage buckets. Without an integrated authentication mechanism, the customer would be forced to operate in the same fashion as in legacy pre-cloud environments. That is, the customer would need to: create users under their account; grant those users access to object storage; and provide user's credentials to the application. This last step can be particularly problematic. The credential has to be placed on the system before the application can become operational. If the system restarts, or new machines are added, this step has to be repeated. It also has to be performed manually by an engineer that has access to the credential, which increases the credential exposure risk. In order to make the process less troublesome, the customer may decide to store the credential persistently on the machine itself, or location where multiple machines can access it. This could further increase the risk of credential compromise. Apart from security problems, such processes do not scale for complex large workloads. The requirement for synchronized actions (e.g., creation of a credential, distribution of the credential) pose serious problems for highly automated cloud workloads. Also, the process has to be repeated every time a customer would like to change the credential.

Modern cloud vendors offer highly integrated Identity Access Management (IAM) solutions. IAM is a framework of policies and technologies for ensuring that the proper people in an enterprise have the appropriate access to technology resources. IAM systems fall under the overarching umbrellas of IT security and data management. Identity and access management systems not only identify, authenticate, and authorize individuals who will be utilizing IT resources, but also the hardware and applications employees need to access. Identity and access management solutions have become more prevalent and critical in recent years as regulatory compliance requirements have become increasingly more rigorous and complex.

It addresses the need to ensure appropriate access to resources across increasingly heterogeneous technology environments and to meet increasingly rigorous compliance requirements. [Compute instances, and other resources dedicated to host customer workloads such as server-less functions, have their own identity recognized by cloud IAM under customer's account. The customer may directly address these components as first-class principals, group them and grant them required access. The compute machines, functions and other components are automatically provisioned with short-lived credentials accessible to the processes they host. Applications retrieve those credentials and use them to access cloud resources.

A problem can arise when a customer intends to host multiple, heterogeneous processes on a single compute instance. This is common, when compute nodes are used to run containers managed by orchestration framework such as used in commercially available container management/clustering services. The core of the problem is the fact that minimum granularity of the identity is a single machine. Just because the containers are hosted on the same machine, it does not mean that they are intended to have the same access to cloud resources. However, as the single machine is the most granular level of identity, the containers all need to share it.

Consider the following example. A customer utilizes two services from a cloud vendor, compute and object storage. The customer's application runs on compute instances and performs storage and retrieval data operations from a bucket within object storage. Without an integrated authentication mechanism, the customer would be forced to operate in the same fashion as in legacy pre-cloud environments. The pre-cloud system would: (1) create a user in their account; (2) grant the user access to object storage; and (3) provide the user's credentials to the application.

This last step is particularly problematic. The credential has to be placed on the system before the application can become operational. If the system restarts, or new machines are added, this step has to be repeated. It also has to be performed manually by an engineer with access to the credential, increasing the risk of credential exposure. To save time, the customer may decide to persistently store the credential on the machine itself, or in a location where multiple machines could access it, further increasing the risk of credential compromise.

Apart from the security problems, this process does not scale for large or complex workloads. The requirement for synchronized actions (e.g., creation of a credential or distribution of a credential) can pose a problem for highly-automated cloud workloads. Further, the process has to be repeated every time a customer would like to change the credential.

Compute instances and other resources dedicated to host customer workloads, such as server-less functions, have their own identity recognized by cloud IAM under the customer's account. The customer may directly address these components as first-class principals, group them and grant them required access. The compute instances, functions, and other components are automatically provisioned with short-lived credentials, accessible to the processes they host. Applications can then retrieve these credentials and use them to access cloud resources.

In a typical implementation, the compute instance includes a locally accessible network service, commonly referred to as a Metadata service. This service allows local workloads on the system to access various information propagated by the cloud vendor, such as the credential for the principal representing the compute instance. The metadata service can be accessible only to the processes running on this specific machine. A process makes a request to the metadata service, receives the credential, and uses it to access other cloud services. The other services use the cloud vendor's IAM service to verify that the principal, representing the instance, has access to perform the requested operation.

Certain embodiments of the present disclosure can provide methods, systems, and computer-readable mediums for managing access to cloud based services. Two types of access control are described herein. First, there is access for the container to the particular cloud service. This access can determine whether or not a container has permissions based on policies that call it service. Furthermore, the second access control is by the compute instance to the cloud service. Therefore, a process running on a container needs permission for that container to access the cloud service, but it also needs permission for the compute instance that the container is a part of to have access to that cloud service.

The disclosure describes systems and techniques that mediate requests between containers and the cloud service in order to provide an adequate level of access control. The disclosed techniques combine an internal authentication of the cloud orchestrator to identify the container caller and cloud service authentication to authenticate calls made to cloud services. In some examples, individual containers running on the system may not get direct access to the metadata service or instance credential. Instead, the containers may send the requests through a request forwarder component. That component establishes the container identity and verifies that the specific container has the access to communicate with the target service. The request forwarder component uses the instance credential to authenticate the call to the target service. The compute instance can be configured in a way that prevents containers from accessing the metadata service. The technique effectively prevents processes in containers to use the compute instance credentials. The container gains access to the cloud service through the machine that it is running on because as a result of these techniques the containers are not given direct access.

When a container is initialized, it can be provided with a credential by the container orchestrator. This process can take different forms, but most typically will be a process that results in a credential being stored on container's file system. According to an aspect of the disclosure, a process being executed in a container intends to make a call to a cloud service. The process can direct a request for cloud services to the request forwarder. The request can include the container credential. The request forwarder can receive the request and determine the identity of the container by sending the container credential to the container orchestrator. The request forwarder can consult one or more policies stored on the system to verify that the container is allowed to access the target cloud service. The request forwarder can obtain an instance credential from metadata service. The request forwarder can send the request to the target cloud service including the compute instance credential. The cloud service can verify the request against the cloud policy to verify that the instance is allowed to perform a given operation by the cloud service.

For the purpose of this disclosure, an instance (e.g., compute instance) is a hosted server that is running either in the Customer Enclave (available publicly) or Service Enclave. If it directly accesses the hardware that it runs on, it can be considered a bare metal instance. If there is a hypervisor between the instance and the operating system, it can be considered a virtual instance. A hypervisor is a piece of software that enables a user to create and runs one or more virtual machines simultaneously. A hypervisor is also known as the virtual machine monitor (VMM). One of the key functions that hypervisor provides is isolation, meaning that a guest cannot affect the operation of the host or any other guest, even if it crashes. Hypervisors can be of two types: Type 1 and Type 2. Type 1 hypervisors can be known as native or bare metal hypervisor, this type of hypervisor runs directly on top of the physical hardware. Each virtual operating system runs atop the hypervisor. Examples of bare metal hypervisors can be the Oracle VM server, Vmware ESX/ESXi and Microsoft Hyper-V. Type 2 hypervisors can also be known as a hosted hypervisor. This type of hypervisor is installed as a software application on an existing host operating system (OS). An example of the hosted hypervisor can be the Oracle VirtualBox, Microsoft Virtual PC, Vmware Server and Workstation.

For the purpose of this disclosure, a container is a collection of schemas, objects, and related structures in a multitenant container database (CDB) that logically appears to an application as a separate database. Within a CDB, each container has a unique ID and name. The root and every pluggable database (PDB) is considered a container. PDBs isolate data and operations so that, from the perspective of a user or application, each PDB appears as if it were a traditional non-CDB.

FIG. 1 illustrates a logical construct for an example cloud network architecture 100. The cloud network architecture can include one or more containers (e.g., Container 1 104, Container 2 106, and Container 3 108). In an implementation, the compute instance 102 can include a locally accessible network service, commonly referred to as metadata service 110. This metadata service 110 allows local workloads on the system to access various information propagated by the cloud vendor, including the credential for the principal representing the compute instance 102. The metadata service 110 can be accessible only to the processes running on this specific machine. A process can contact the metadata service 110 to obtain the credential and use that credential to access other cloud services (e.g., Cloud Service A 112, Cloud Service B 114, or Cloud Service C 116). The services use the cloud vendor's IAM service to verify that the principal, representing the instance, has access to perform the requested cloud operation.

A problem can arise when a customer intends to host multiple, heterogeneous processes on a single compute instance 102. This can be common, when compute nodes are used to run containers managed by an orchestration framework (e.g., such as a container management/clustering service or the like). The minimum granularity of the identity can be a single machine. Previous techniques may have just assigned access to one or more cloud services to the machine, not necessarily to different containers located on the same machine. Just because the containers are hosted on the same machine, it does not mean that they are intended to have the same access to cloud resources. However, as the single machine is the most granular level of identity, they all need to share it.

For example, as depicted in FIG. 1. Container 1 104 only communicates with the Cloud service A 112. Container 2 106 communicates with Cloud service A 112 and Cloud Service B 114. Container 3 108 communicates with Cloud service C 116. In one arrangement, a customer can accept the risk of nodes having access to cloud services that were not intended. In this arrangement, the compute nodes are granted all the access that any container they host may need, with all containers receiving access node credentials. This approach effectively compromises security for convenience. For example, in the arrangement shown in FIG. 1, compute instance 102 can be provided access to Cloud Service A 112, Cloud Service B 114, and Cloud Service C 116. As an example, processes running on Container 1 104 may be prohibited from accessing Cloud Service C 116 potentially because the service belongs to a competitor entity. If access is only controlled by the computing instance, the processes running in Container 1 104 may inadvertently gain access to Cloud Service C 116 because the compute instance 102 provided permissions for all containers to access all three cloud services illustrated.

In a second arrangement, a customer can selectively disable metadata service 110 access to some containers. In this arrangement, containers that do not need access to any cloud resources can be forbidden access to metadata service 110. This can be simple to implement, but is an all or nothing approach. This arrangement is not helpful for containers having different access needs. So using firewall rules or network policies, a user may decide to only allow this container to access that metadata service network wide. Furthermore, this works only if that container needs access to any services. So one can at least isolate components that do not need access to any cloud services by breaking the path for the containers to obtain a credential.

In a third arrangement, a customer can distribute containers to separate machines. In this arrangement, a customer may create a group of compute nodes and grant each group different access. A customer can subsequently configure the container orchestrator to place the containers on nodes with access that matches needs for each container. The nodes can be placed into different groups. The groups assign those nodes different access and then configure the scheduler in the container orchestrator to only assign specific containers to specific nodes. This approach works in limited cases, but, the more one needs to do it, the more fragmented the set of machines becomes and the more a user is losing out on machines and overall the workload density suffers. This arrangement provides containers with tailored access to cloud resources. However, this arrangement can be more complicated and requires careful planning and mapping policies to nodes and nodes to containers, and may result in poor utilization of resources.

A customer may also use any combination of these options, increasing the complexity of access management. The disadvantages of the above-mentioned solutions increase with the size and complexity of the workload, in particular the number of different containers and their cloud service access needs. Accepting the risk will result in increasingly larger access given to individual containers, even though they may not need it. Distributing a large number of containers may result in an increasingly larger number of different machines required and complexity in finding the right set of access needed on each node. At the extreme, a customer may decide to have a pool of machines for every container type which will provide perfect access restrictions, but undermine the very purpose of using container management service and greatly increase the cost due to low process density.

Some providers, such as commercially available container management/clustering services, provide support for containers (e.g., a pod) with their own type of principal in their managed service. As such, access can be granted directly to the containers themselves rather than relying on the metadata service 110. While this may be a useful solution, it is limited to a given vendor and the vendor's specific service.

Customers who intend to manage their own cluster, or want to use a different framework will not be able to implement this solution.

II. Logical Construct for Cloud Network Architecture

As a cloud service adds and removes containers or rules are added, multiple types of instances may be required. The multiple types of instances may grant different levels of access to the different instances. This process can be difficult to perform at scale and is more complicated than simple manual mapping of the network.

Access of the machine-to-cloud services can be managed by a cloud IAM. The disclosed techniques can determine two policies. One policy manages container access within the node. The second policy manages node access within the cloud.

A potential IAM solution can establish a request forwarder that can identify the component making a call for cloud services. The component can use its own identity to make a call to the cloud provider service. Such request forwarder can access one or more policies that can determine a configuration and which services can call with which APIs, and with which credentials.

Such system can be difficult to implement at scale or with the modern fast-paced software delivery paradigms. New or updated components may be delivered on a daily basis, each time having different needs for communicating with the cloud services. This renders any manual management of the individual component policies impractical and error prone. This, in turn, may result in an overly permissive policy allowing all components to access unneeded services. Access of the compute node itself must be managed as well, to ensure no discrepancies exist between it and the combined permissions of all the containers running on the node.

A second issue can be managing compute node access. The above discussion assumes that the compute node has sufficient access to handle all requests from various containers located on the node. However, managing compute node access can also be very difficult, especially in rapidly changing environments. In principle, the compute node has to have the access that is a union of all access needs of all the containers hosted on that node. As containers on the node are added, removed, or relocated, the access requirements for the node change. This commonly results in granting excessive rights to compute nodes, as a means to ensure that all containers have their required access. Best security practices mandate the node access be granted to the smallest possible set. Management of node access, now properly understood as distinct from management of containers' access, becomes a major operational hurdle.

The present disclosure describes a system that automatically infers the minimal required set of access needs, for both containers and compute nodes. Those needs are further represented as a policy that is provided to the request forwarder and cloud IAM. It also combines the life cycle of the component with the life cycle of the policy itself. Further, the system allows for specifying criteria, or access rules, to control how access is assigned to nodes.

With such a system, users can deliver new components and modify existing components quickly, while ensuring that access granted to cloud services remains minimal. Without an automated mechanism for generating narrow and specific policies, users may tend to grant overly permissive access to the containers and, even more likely, compute instances. Alternatively, when high-level of security is expected, manual provisioning of single centralized policies may negatively impact the performance of the feature release cycle. The disclosed system allows a development team to achieve high velocity delivery without sacrificing high security with access controls. Further, because of the ability to specify rules for access, the system can automatically partition containers to nodes, automatically building secure isolation boundary for the containers.

Figure 2:
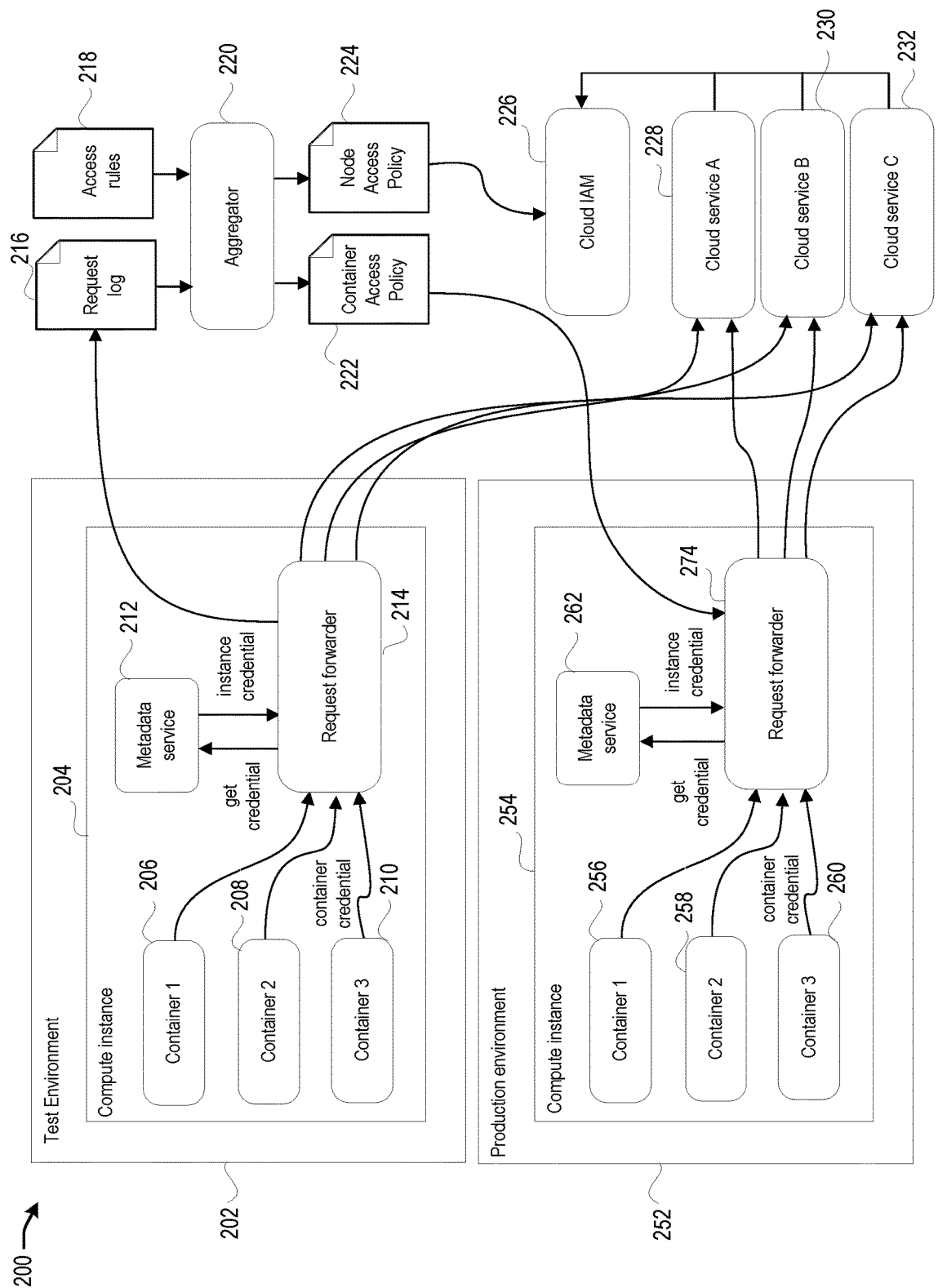
FIG. 2 illustrates a logical construct for a second example cloud network architecture.

FIG. 2 illustrates a logical construct for a second cloud network architecture 200. The disclosed system operates in two key phases. In the first phase, the container is subjected to integration tests. The test environment is provisioned with the request forwarder which is set to run in permissive mode. Such tests, which are typical in continuous delivery and containerized systems, exercise the container's functionality and trigger calls to the cloud provider. The requests to the cloud provider are logged by the request forwarder. This log is then aggregated to create a cloud service access policy specific to the particular container, as well as the cloud service access policy for the compute node (often group of nodes) hosting the container. Policy creation can be fine-tuned by access rules provided as system configuration. Such access rules may, for example, prevent one node having access to two specific cloud services. The policies are then packaged with the container into a single deployment package.

The deployment package consists of: a container, the container-specific policy, and a node policy. An infrastructure orchestration system deploys the node access policy 224 to the cloud IAM 226, while the container and container-specific access policy 222 are deployed to the container cluster. The cluster then deploys the container and sends its policy to the request forwarder. Similarly, when the container is removed, the access, that is the container access in forwarder and an unnecessary part of the policy granted to the compute node, is removed.

The second cloud network architecture 200 can include a test environment 202. The test environment 202 can include one or more compute instances 204. The compute instance 204 can include one or more containers (e.g., Container 1 206, Container 2 208, and Container 3 210). Each of the containers can receive a credential to identity to the container on the network. In various examples, a container orchestrator can provide the identity to the container upon creation. The container identity can be stored in memory for the container.

As previously discussed for FIG. 1, a process being executed in a container of the compute instance 204 can request cloud services (e.g., Cloud Service A 228, Cloud Service B 230, or Cloud Service C 232). The container can send its container credential to a request forwarder 214. The request forwarder 214 can act as a proxy between containers and cloud services. The request forwarder 214 is responsible for obtaining credentials so that a component on the machine can call with the instance credential to cloud services which allow the network architecture to disconnect all of those containers from accessing that credential. So those containers do not have that credential and now the containers have to make all the calls through the request forwarder 214 because that is the only way to get a credential. The request forwarder 214 can receive the request from the container including the container credential. The request forwarder 214 can verify the credential with the container orchestrator in the control plane. The request forwarder 214 can send the container credential to the container orchestrator and receive back the container identity.

In the test environment 202, the request forwarder 214 can send a request to a metadata service. The request can include the container credential. The metadata service 212 can use the container credential to obtain an instance credential. The request forwarder 214 can transmit the request for cloud services from the one or more containers to the request log 216. The request can be stored in the request log 216. The request log 216 data can be stored on a server. An aggregator 220 can aggregate the one or more requests and store the aggregated list on the server. The aggregator 220 can also receive one or more access rules 218. The aggregator 220 can generate one or more container access policies 222. The aggregator 220 can generate one or more node access policies 224.

The production environment 252 can include a compute instance 254. The compute instance 254 can include one or more containers (e.g., Container 1 256, Container 2 258, and Container 3 260). Each of the containers can receive a credential to identity to the container on the network. In various examples, a container orchestrator can provide the identity to the container upon creation. The container identity can be stored in memory for the container. The compute instance 254 can include a request forwarder 274. The request forwarder 274 can act as a proxy between containers and cloud services. The request forwarder 274 is responsible for obtaining credentials so that the component on the machine can call with the instance credential to cloud services which allow the network architecture to disconnect all of those containers from accessing that credential. So those containers do not have that credential and now the containers have to make all the calls through the request forwarder 274 because that is the only way to get a credential. The request forwarder 274 can receive the request from the container including the container credential. The request forwarder 274 can verify the credential with the container orchestrator in the control plane. The request forwarder 274 can send the container credential to the container orchestrator and receive back the container identity.

The compute instance 254 can include a metadata service 262. The request forwarder 274 can send a request to a metadata service 262. The request can include the container credential. The metadata service 262 can use the container credential to obtain an instance credential. The request forwarder 274 can access the container access policies 222. In various embodiments, the container access policies 222 can be stored on the compute instance 254. In the production environment, the request forwarder 274 can receive the one or more container access policies 222. The container access policies 222 can be used to determine which cloud services, if any, the container is permitted to use. The request forwarder 274 can use the container access policies 222 to determine permissions for the container. The request forwarder 274 can request an instance credential from the metadata server 222. The metadata server 262 can send instance credential information based on the container access policy 222 for the container. The request forwarder 274 can send the request to the cloud services (e.g., Cloud Service A 228, Cloud Service B 230, or Cloud Service C 232). The instance credential can be attached to the request sent to the cloud services.

Figure 3:
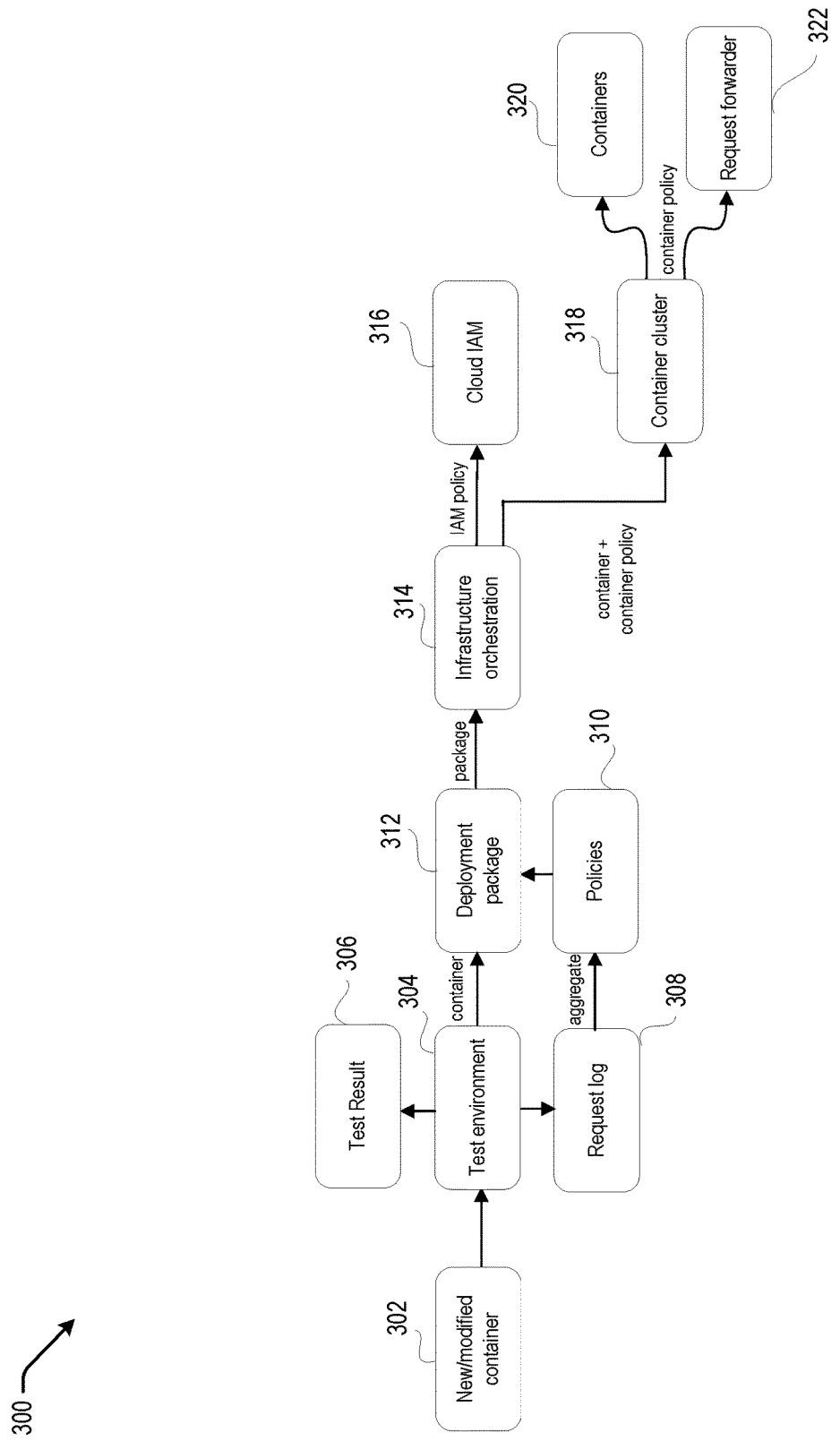
FIG. 3 is a flowchart of an example process associated with a technique for automatically configuring minimal cloud service access rights for container applications.

FIG. 3 is a flowchart of an example process 300 associated with a technique for automatically configuring minimal cloud service access rights for container applications. At 302, the process 300 can begin by adding a new or modified container to the cloud server infrastructure.

At 304, the container can enter the test environment. In the test environment, the request forwarder can be set to run in permissive mode. The test environment does not control access but is used to identify the access needs. Such tests, which can be typical in continuous delivery and containerized systems, exercise the container's functionality and trigger calls to the cloud provider. The test environment should be as comprehensive as possible, otherwise the tests may have gaps and may not catch the request need and therefore, they will not grant the access.

The test environment can exist in the cloud. Within the test environment there can exist a baseline policy that provides the maximum allowed access that the system can have. For example, the baseline policy may provide restrictions such as connecting to functions as a service (e.g. due to security concerns). So in this case, the test machines will not be provided access to function as a service. So if one attempts to connect through that system, and with otherwise permissive policies in place, the test will fail, because that machine used for the test will not have that access, and the test will fail. This is intended, so developers can see what access is not possible.

At 306, the test results can be received. The test results can determine whether one or more applications running on the container can access one or more cloud services. If the test result is negative, the process does not proceed because either the container is broken or miscoded, or the baseline policies prohibit access.

At 308, the requests to the cloud provider can be logged in a request log by the request forwarder. The request log can be stored on the server.

At 310, the request log is then aggregated to create a cloud service access policy specific to the particular container, as well as the cloud service access policy for the compute node (often group of nodes) hosting the container. This process can be performed by a type of infrastructure orchestration. Policy creation can be fine-tuned by access rules provided as system configuration. Such access rules may, for example, prevent one node having access to two specific cloud services. The policies are then packaged with the container into a single deployment package.

At 312, a deployment package can be generated. The deployment package can include a container, the container-specific policy, and node policy.

At 314, an infrastructure orchestration module can receive the deployment package.

At 316, the infrastructure orchestration module can deploy the node access policy to the Cloud IAM. The node access policy provides the machines access.

At 318, the infrastructure orchestration module can deploy the container and the container-specific access policy is deployed to the container cluster.

At 320, the container cluster can deploy the container. The container here goes to the container cluster or container with the policy, and the container itself gets deployed to the containers and the policy gets deployed to the request forward. So now, request forwarder is aware of what access individual containers running on the node can use and controls that access, and cloud IAM now has the policy that allows those machines to wield that access based on that configuration.

At 322, the container cluster sends the policy to the request forwarder. Similarly, when the container is removed, the access, that is the container access in forwarder and the unnecessary part of the policy granted to the compute node, are removed.

In an example operation, a new container is identified for use for the first time in the application. To proceed two things are required. First, the process needs a policy that allows that container to use the object store, so the node will recognize this container, but not the other containers. This allows the container to access object store, and that machine that this container will be running on has to have access to the object store. So those two policies are created, packaged together with the new container. Now, when the container is deployed and the infrastructure orchestration unpacks it, the deployable artifact provision provides access to cloud IAM, so that the machine and this container will get deployed to a group of machines that will now have access to access object store, which it never had before. Furthermore, when that container is deployed to the container cluster, the request forwarder, or any other mechanism that controls such access, will know that this container has access to the object store. So even though there may be other containers running on that machine, those containers will not get access to the object store even though that machine technically can access the object store.

The container cluster can be spread over multiple machines or multiple compute instances (e.g., Kubernetes, Docker Swarm, or Openshift). The container orchestrators can be systems that place and manage containers on multiple machines. Those machines can be abstracted as workers. Those machines can be added, or removed by the container orchestrators that provides that container to another machine if a machine dies. Those machines may have groups (e.g., a machine group), which can be a set of machines that this container can be running on. This group of machines can also be referred to as a node from the point of view of container orchestrators. From the point of view of cloud infrastructure, they can be referred to as instances. The instances can be virtual machines or bare metal computers.

The Cloud IAM can control access to the group of either virtual machines or bare metal machines or a combination that the container cluster sets. The Cloud IAM controls what principals in that cloud environment have access to what is within the cloud. The machines are typically placed into groups and those groups of machines are granted access to cloud services. Groups allow for scaling up and down to grant access to groups of machines to allow another machine to take over if one instance is unable to handle the load.

Figure 4:
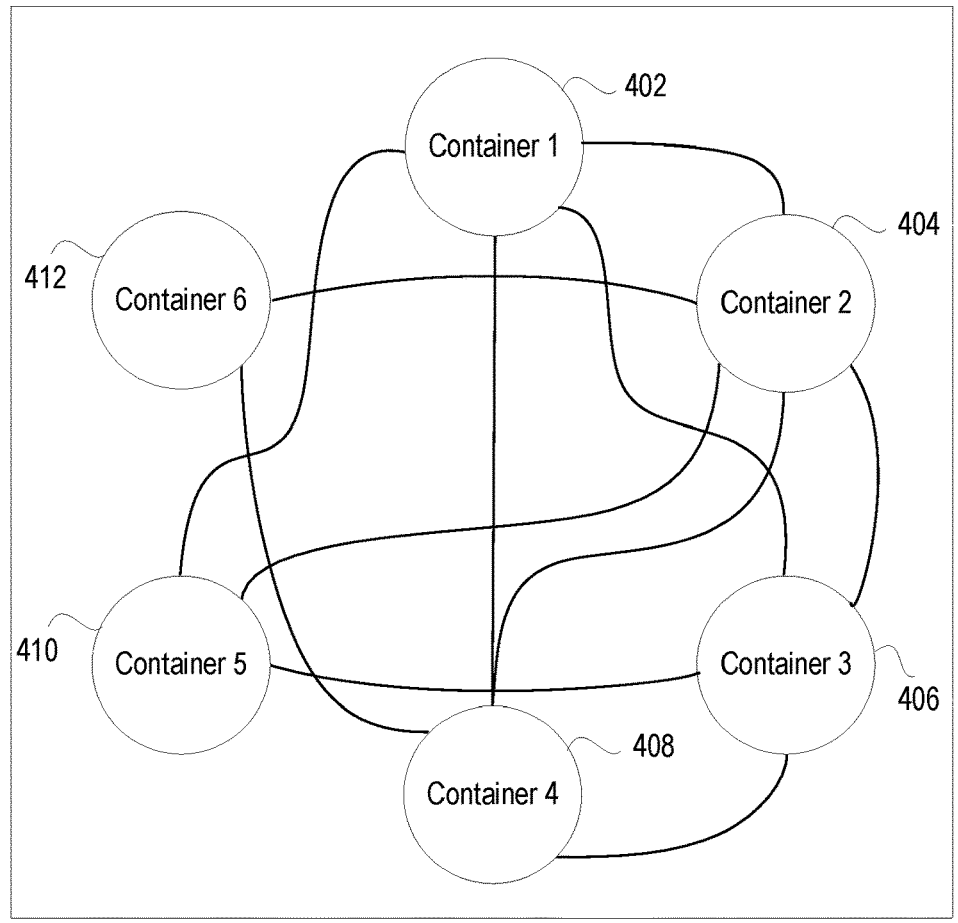
FIG. 4 illustrates an example arrangement diagram showing allowed arrangement of the disclosed system.

FIG. 4 illustrates an example arrangement diagram 400 showing allowed arrangement of the disclosed system. The example can assume a workload that consists of six containers, and the following connectivity needs were identified in the test environment. Table 1 illustrates a Container/Services or Resources chart. An example service can be Oracle Cloud Infrastructure (OCI) that allows for managing and scaling networks. Another example service can be a VMware Configuration Manager (VCM). A resource within the service may be a subnet or a load balancer.

TABLE 1

| Container | Services/Resources |
| --- | --- |
| Container 1 | Service A |
| Container 2 | Service B |
| Container 3 | Service B |
|  | Service A |
| Container 4 | Service C/Resource X |
| Container 5 | Service A |
|  | Service C/Resource Y |
| Container 6 | Service D |

In the example, access rules can be specified by system administrator to reflect security requirements of the service. The example access rules can require separate access to Service C/Resource X from Service C/Resource Y. The access rules can also require separate access to Service A from Service D. These rules provide restrictions on what access can be granted to compute nodes and tune system operation. Based on the known communication paths, and access control restrictions, the system can identify which containers can be co-located on the same nodes. This is depicted in the "Allowed arrangements" graph illustrated in FIG. 4. Using graph operations, the system can identify groups of containers that can be shared and a number of distinct nodes. With reference to FIG. 4, Container 1 402 can be co-located with Container 2 404, Container 3 406, Container 4 408 or Container 5 410 but not Container 6 412. Container 2 can be co-located with Container 1 402, Container 3 406, Container 4 408, Container 5 410 or Container 6 412. Container 3 406 can be co-located with Container 1 402, Container 2 404, Container 4 408 or Container 5 410. Container 4 408 can be co-located with Container 1 402, Container 2 404, Container 3 406, or Container 6 412. Container 5 can be co-located with Container 1 402, Container 2 404, or Container 3 406. Container 6 can be co-located with Container 2 404 or Container 4 408.

Figure 5:
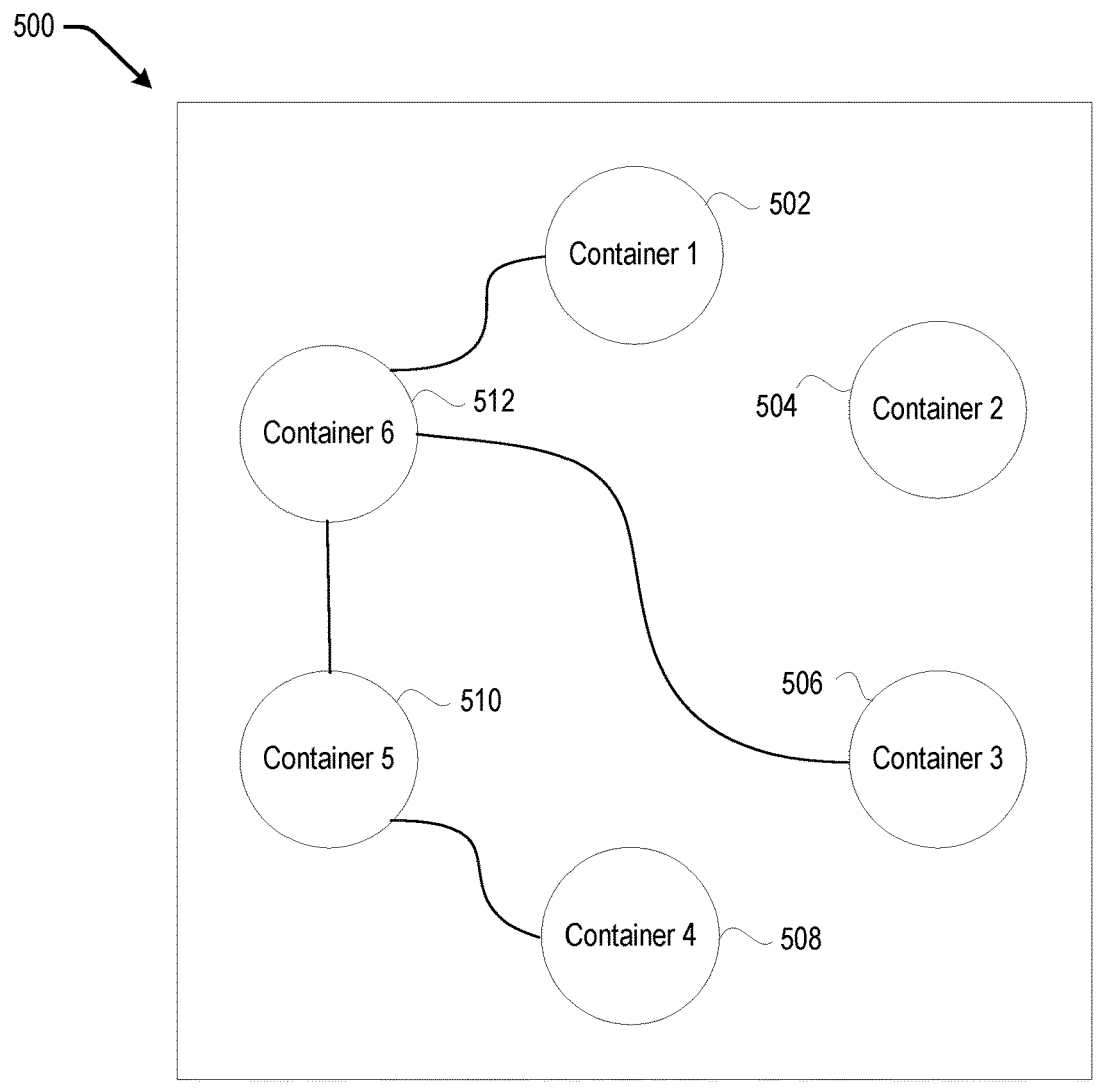
FIG. 5 illustrates an example arrangement diagram showing forbidden arrangement of the disclosed system

FIG. 5 illustrates an example arrangement diagram 500 showing forbidden arrangement of the disclosed system. FIG. 5 follows the same access rules specified in Table 1 and discussed for FIG. 4. One approach to perform this operation is to capture forbidden arrangements of containers using a graph. This is depicted in the "Forbidden arrangements" graph shown in FIG. 5. Given a Forbidden arrangement, any set of disconnected graph nodes becomes a valid grouping for a container. This is captured in "Allowed grouping" as shown in FIG. 4. Note that Container 2 504 is disconnected from every node; as such, it may be included in any container grouping. Also, note that other possible arrangements exist which are not shown. The system may only provide the strict criteria for container grouping, allowing the container orchestrator to schedule containers based on its own algorithm and considering other factors, within these constraints. As shown in FIG. 5, Container 1 502 is forbidden to be co-located with Container 6 512. Container 2 504 is not forbidden to be co-located with any other container. Container 6 512 is forbidden from being co-located with Container 1 502, Container 3 506, or Container 5 510. Container 3 506 is forbidden from being co-located with Container 6 512. Container 5 510 is forbidden from being co-located with Container 6 512 and Container 4 508. Container 4 508 is forbidden from being co-located with Container 5 510.

From the "Allowed grouping" example above, the node group's access needs are identified, representing the union of access needs of containers, and can be scheduled as shown in Table 2:

TABLE 2

| Node Group | Service/Request |
| --- | --- |
| Node group 1 | Service B |
|  | Service D |
|  | Service C/Resource X |
| Node group 2 | Service A |
|  | Service B |
|  | Service C/Resource Y |

Figure 6:
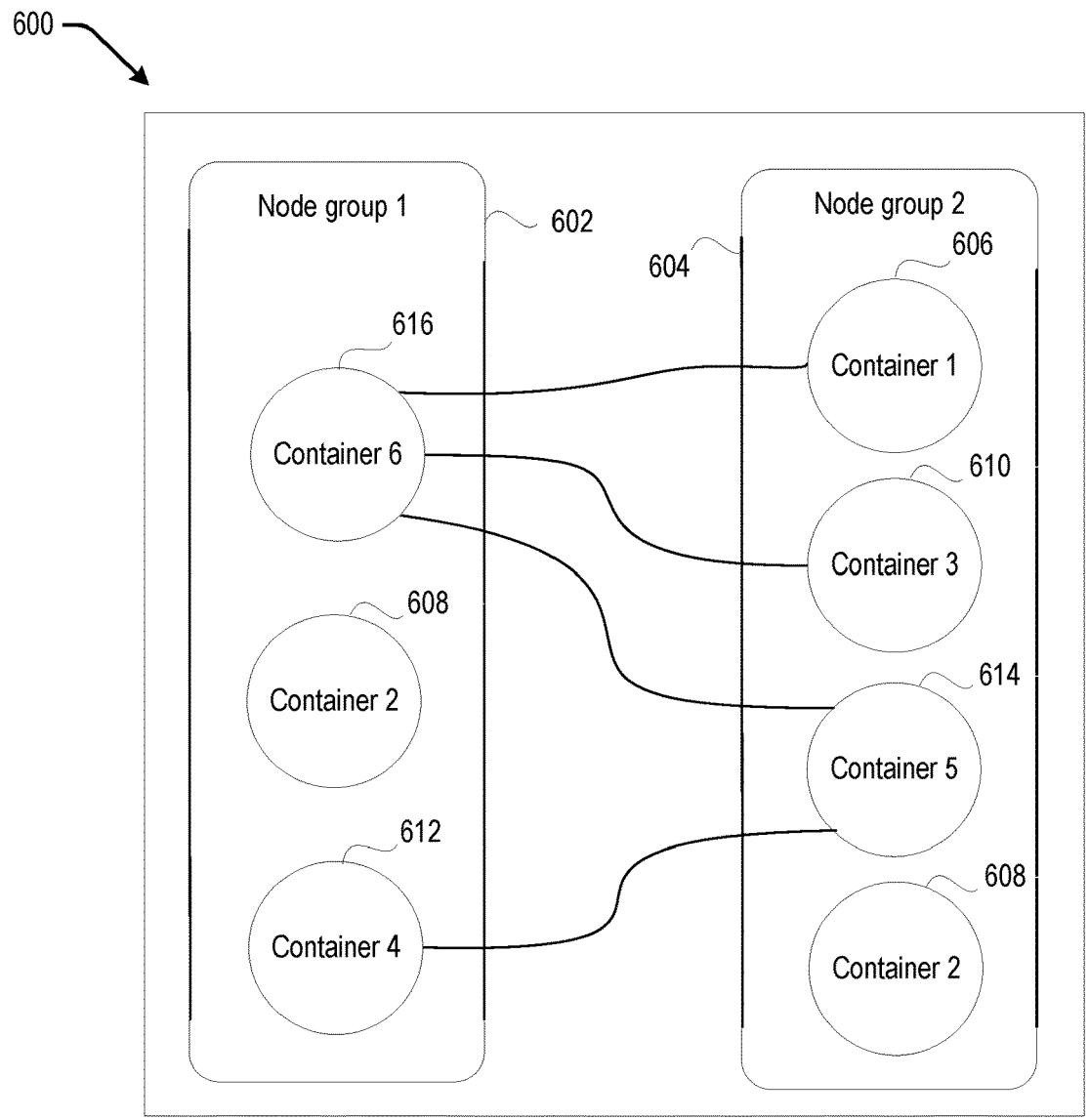
FIG. 6 illustrates an example diagram of allowed grouping.

FIG. 6 illustrates an example diagram 600 of an allowed grouping. This grouping follows the prescribed access rules. Also, this grouping provides a natural separation of containers that emerges from the rules. The access needs for the individual containers, as well as node groups, are captured in respective policies and packaged with respective containers. Cloud orchestration system, such as Terraform, may be used to automatically deploy the policies to cloud IAM, and perform any required node grouping using the mechanism specific to a particular cloud infrastructure. If the system operates in a mode in which the policies for the compute nodes are not set, the system may examine existing node groups, identifying ones that match the containers, and subsequently report insufficient or excessive permissions.

FIG. 6 illustrates Node Group 1 602 and Node Group 2 604. Node group 1 602 can include Container 2 608, Container 4 612, and Container 6 616. Node Group 2 can include Container 1 606, Container 3 610, Container 5 614, and Container 2 608.

The allowed groups diagram 600 is from the point of view of implementation. The system can analyze the diagram 600 to determine the allowed arrangements. For example, the first group of machines can host Containers 2, 6 and 4 and the second group can host Container 1, 3, 5 and 2. As depicted, Container 2 can be hosted in both Group 1 and Group 2 of machines, which may be useful for performance reasons. For example, there may be excess capacity in node Group 2 and Container 2 can be placed there. This is merely one possibility.

In an example, every container can get its own node group. That also works, but that is not optimal and helpful. As the system knows that this is the allowed grouping of containers, the system can now create node groups; can schedule containers in those node groups; can identify a combined policy of each of the groups because the system knows what are the specific needs of the containers; and can assume that the node itself does not need any access.

But in general, that the combined need of a group of machines are only the needs of all of the containers on that machine. So node Group 1 gets access to service BDC, and resource X node group 2 gets access to service ABC resource Y. This results in a policy. By identifying the needs of containers, the system creates a logical isolation within the application that respects those rules. The logical isolation of applications can be created by containers being placed in the groups of nodes and those containers in that group of nodes, is something that like a security engineer would do in the review with the team. The system can infers that logical separation of the environment through completely different mechanisms through those rules that it wanted to achieve. And those rules will be held like if, for example, the system keeps adding more containers that have other access needs and so on.

There can be a situation where this problem cannot be solved graph-wise; this is in a case where one container violates some of the rules. If the system were to separate access to service C resource X from service resource Y, the system would have a container that accesses both resources in the service. This problem cannot be solved because it cannot access both service resources and the system will fail. It will fail at the aggregation step, which is probably beneficial. For this reason, the system will determine that it cannot actually proceed because the designer has created a container that violates the rules that the system had established.

Figure 7:
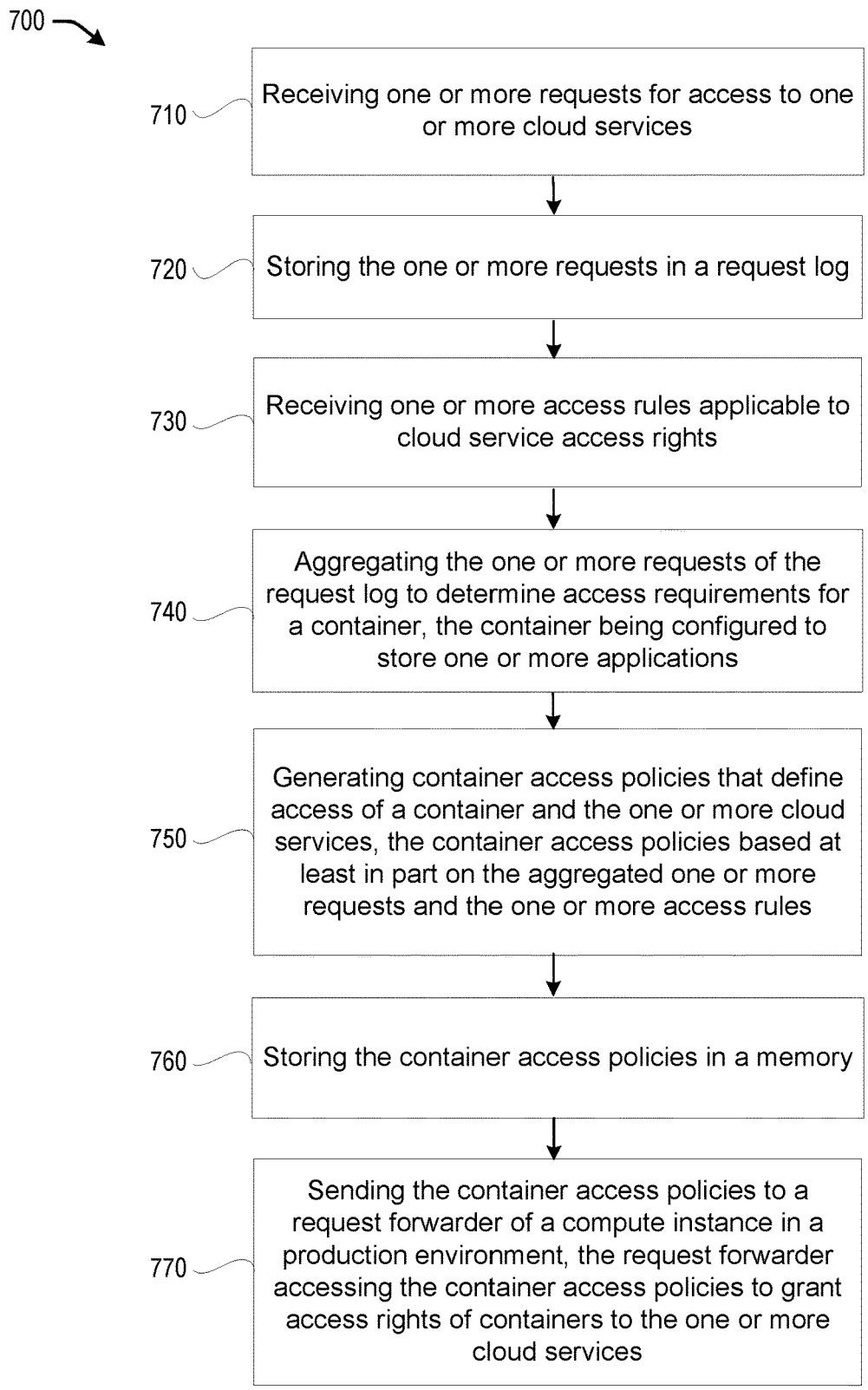
FIG. 7 is a simplified flowchart for a technique for selective container access to cloud services based on a hosting node using a request forwarder as a service.
Figure 12:
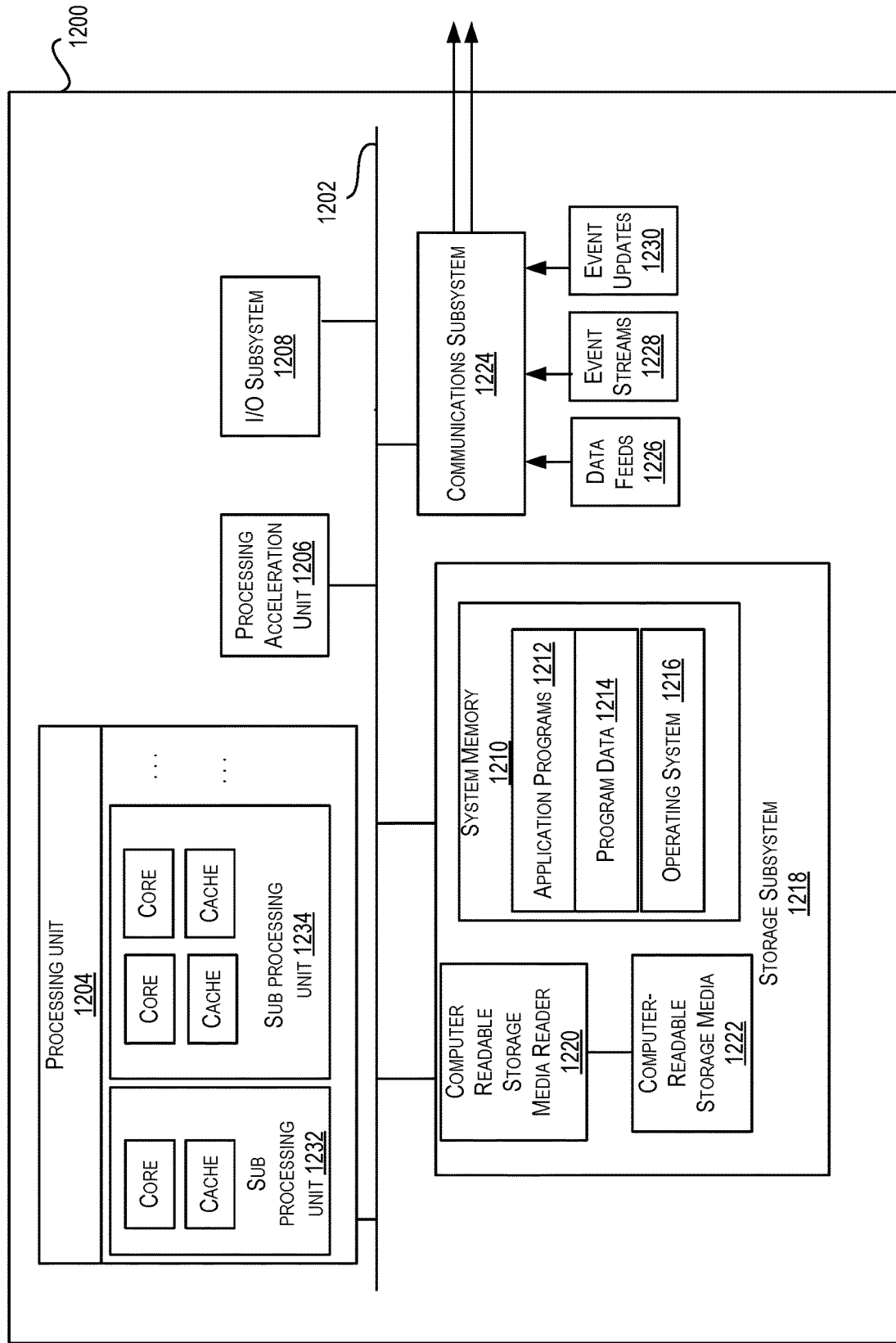
FIG. 12 is a block diagram illustrating an example computer system, according to at least one embodiment.

FIG. 7 is a flowchart of an example process 700 associated with techniques for automatically configuring minimal cloud service access rights for container applications. In some implementations, one or more process blocks of FIG. 7 may be performed by a computer system (e.g., computer system 1200 as shown in FIG. 12). Additionally, or alternatively, one or more process blocks of FIG. 7 may be performed by one or more components of device 1200, such as processing unit 1204, storage subsystem 1218, communications subsystem 1224, Input/Output subsystem 1208, and bus subsystem 1202. The processing unit 1204 can include sub-processing units 1232, 1234. The storage subsystem 1218 can include a system memory 1210. The system memory 120 can include application programs 1212, program data 1214, and an operating system 1216. The storage subsystem 1218 can include a computer readable storage media reader 1220 and a computer readable storage media 1222.

As shown in FIG. 7, process 700 may include receiving one or more requests for access to one or more cloud services (block 710). For example, the computer system may receive one or more requests for access to one or more cloud services, as described above.

As further shown in FIG. 7, process 700 may include storing the one or more requests in a request log (block 720). For example, the computer system may store the one or more requests in a request log, as described above.

As further shown in FIG. 7, process 700 may include receiving one or more access rules applicable to cloud service access rights (block 730). For example, the computer system may receive one or more access rules applicable to cloud service access rights, as described above.

As further shown in FIG. 7, process 700 may include aggregating the one or more requests of the request log to determine access requirements for a container, the container being configured to store one or more applications (block 740). For example, the computer system may aggregate the one or more requests of the request log to determine access requirements for a container, the container being configured to store one or more applications, as described above.

As further shown in FIG. 7, process 700 may include generating container access policies that define access of a container and the one or more cloud services, the container access policies based at least in part on the aggregated one or more requests and the one or more access rules (block 750). For example, the computer system may generate container access policies that define access of a container and the one or more cloud services, the container access policies based at least in part on the aggregated one or more requests and the one or more access rules, as described above.

As further shown in FIG. 7, process 700 may include storing the container access policies in a memory (block 760). For example, the computer system may store the container access policies in a memory, as described above.

As further shown in FIG. 7, process 700 may include sending the container access policies to a request forwarder of a compute instance in a production environment, the request forwarder accessing the container access policies to grant access rights of containers to the one or more cloud services (block 770). For example, the computer system may send the container access policies to a request forwarder of a compute instance in a production environment, the request forwarder accessing the container access policies to grant access rights of containers to the one or more cloud services, as described above.

Process 700 may include additional implementations, such as any single implementation or any combination of implementations described below and/or in connection with one or more other processes described elsewhere herein.

The process 700 may operate in two modes. In the first mode, the process 700 controls access to cloud services. In the first node, both the access for the container as well as the access for the node are set dynamically by the system. All access requirements for containers and nodes, used by the cluster, are automatically configured. The system may be configured to tune how the access is granted to nodes. In the simplest case, all nodes are equal and any container can be scheduled on any node. In this case, each node needs access permissions equal to the combined access of all the containers. However, it is common for application designers to separate containers so that an attack on one container (i.e., one that is more exposed or less trusted) does not expose other containers in the same node. The process for separating containers can be a manual process and depends on expert understanding of the system and security constraints. In the disclosed system, the requirement for deciding how individual containers should be separated can be eliminated. A system may be configured with general rules regarding how access should be granted (for example, one system must not have access to two specific services, or resources). With such rules in place, the system automatically partitions the cluster into groups of nodes with distinct access and assigns the containers to correct nodes with sufficient access. At the same time, it retains flexibility in assigning containers that can operate in multiple groups to any of the nodes in the cluster. While this mechanism has its benefits, some users may have a strong preference towards manual configuration of the nodes' access in the system, or may not be willing to delegate any IAM access management to the automated system.

In a first implementation, process 700 includes generating node access policies, the node access policies specifying access policies for granting groups of compute instances a combined access of one or more containers on a node, and storing the container access policies in the memory.

In a second implementation, alone or in combination with the first implementation, process 700 includes granting access permissions equal to combined access of the one or more containers assigned to the node.

In a third implementation, alone or in combination with one or more of the first and second implementations, process 700 includes partitioning the compute instance with a plurality of compute instances into groups of nodes, each of the nodes having distinct access, and assigning one or more containers to a node with sufficient access based at least in part on the node access policies.

In a second mode, the process 700 is not controlling node access to cloud services. In a fourth implementation, alone or in combination with one or more of the first through third implementations, access is pre-determined and container access within each node is dynamically configured. Where the user prefers not to delegate access management to an automated system, the nodes' access can be pre-configured and known to the system. Here, only the container access granted within the node is dynamically configured. The system may then place containers with specific access needs to nodes with sufficient access when needed. Because the access granted to compute nodes is pre-defined and immutable by the system, it may happen that the container will require access which no node in the cluster can allow. This can be detected in the testing phase. If a forwarder is unsuccessful in making a request, the failure is logged, indicating that changes must be made to the compute instance's permissions. There are multiple ways to determine if the forwarder's requests are failing. In a testing environment, failure of the test itself would be sufficient evidence, presuming the test instance and production instance have identical permissions.

In a fifth implementation, alone or in combination with one or more of the first through fourth implementations, process 700 includes testing access requirements for a cloud system, detecting a failure of a specific application to access the one or more cloud services based at least in part on an entry in the request log, and changing permissions of a compute instance to remedy the failure.

In a sixth implementation, alone or in combination with one or more of the first through fifth implementations, process 700 includes setting the request forwarder for each container type in the production environment to a permissive mode, the permissive mode granting access of the one or more applications stored in the container to the one or more cloud services, receiving the one or more requests from the request forwarder, and in accordance with a number of the one or more requests exceeding a threshold requirement, switching the request forwarder to a restrictive mode, the restrictive mode granting access of the one or more applications to the one or more cloud services based in part on the container access policies.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

III. Centralized Request Forwarder

Separate centralized nodes, or separate sets of request forwarders supporting multiple nodes, or any combination of nodes are all permissible. The disclosed system can support all of these options, by managing container policy with the forwarder assigned to that container, and node policy for the node that hosts that forwarder, regardless of where that node is located. Similarly, the system may support a centralized cloud version of the request forwarder, by granting access to that entity based on combined container needs.

There can be multiple ways of locating the request forwarder. In one example, the request forwarder can be centrally located. In another example, the request forwarder can be outside of the machine as long as there is a mechanism to provision that policy and identify the container. In some examples, there may be no request forwarder in the production model. Finally, the container policy can acquire the container policy in the production environment. This can be done if a client does not believe the tests are comprehensive enough or that there is no test environment. In this case, the technique may be implemented only in the production environment having a permissive mode initially, and, as additional requests are received, it learns the access needs. When the access needs have been identified, it obtains enough information that it knows all of the access needs and it can begin to enforce those needs.

In one example, over the last number of requests, there is no request that is new. There can be different thresholds that can be configured to say that enough access was achieved, and was identified. Then the system starts enforcing the access rights. The system can run with an overly permissive policy at the beginning, but eventually that policy becomes more restrictive. This is preferable to running in a permissive mode forever.

If the container is removed, the access may be removed. If the system is provided a new container, then access may not be available and the process will understand the lifecycle of the container and remove previously established rules if, for example, a new version of the container is deployed.

The cloud network architecture can include multiple compute instances. One or more compute instances can store various containers. Another separate compute instance can include a request forwarder, a Metadata Service, and one or more policies. The cloud network architecture can include various cloud services (e.g., Cloud Service A, Cloud Service B, and Cloud Service C). The cloud network architecture can also include a container orchestrator. The request forwarder can be either centralized for multiple nodes or each node can have its own request forwarder. The centralized/dedicated request forwarder node implies that different nodes (that may contain multiple containers) can forward their requests to the cloud services via a centralized node. The instance credentials do not need to be stored on every node, only on the node on which the request forwarder is present. The request forwarder does not necessarily need to be located on the same node as the container it supports.

There are pros and cons for both of these architectures. With regard to the centralized/dedicated request forwarders, the nodes' resources can be dedicated to just performing the duties of the request forwarder while other nodes can focus on using their resources to perform their tasks. Apart from this, the instance credentials need not be stored on every node, just on a centralized instance. However, the drawback of this approach can be that the centralized request forwarder acts as a single point of failure. If it goes down, none of the containers can make requests to the cloud services. As for having the request forwarder on every node, the network rules/architecture will be much simpler to create and get functioning. Another advantage of the per-node forwarder would be that each node has its own request forwarder, resulting in each node only processing the workload for its containers. One disadvantage of this design is that per node credentials must be maintained for access to cloud services. This makes the issue of proper key rotation and revocation harder by a factor of the number of nodes involved. A hybrid approach may involve using a subset of cluster nodes to host the request forwarder.

In various embodiments, there is no request forwarder in production. The system may be also useful in a situation when there is no request forwarder in production. In this case, if the containers have all the access that the node has, there is no policy for individual containers to be set. However, the access of the node will be constrained to the union of all the containers on the node. This, while not restricting container access to a minimum, still restricts the node access automatically, which is a major advantage over configuring that access manually.

In various embodiments, the container policy can be acquired in the production environment. While the system is most likely to be used in two phases, where the data required to construct the policy is acquired in a trusted test environment and then deployed to production system together with the container, an alternative mechanism is possible with just the production environment.

This mechanism involves switching the permissive/restrictive mode of the request forwarder individually for each container type in the production environment. The first time a container is deployed, the request forwarder sends all the requests to the cloud service while also producing a log of the requests. After sufficient data is gathered, it switches to the restrictive mode for that specific container. This implementation does not provide the same level of security, as there is a period of time in which all the access to the cloud services is allowed. It does, however, reduce the cost of system operations and may be sufficient for some users, especially when the turnaround of containers is low. The decision for when enough data is acquired to switch modes can be done manually, or based on time, or by analysis of how many new types of requests are being forwarded. For example, if all the requests sent to the forwarder contain no new requests given a specified number of requests, the gathered data may be considered sufficient. Access to the node may be managed in a similar fashion, starting with excessive access (within a reasonable boundary set by the administrator) and reduced to specific permissions required by individual containers, provided that the access needs for all containers on the node were fully established.

IV. Infrastructure As A Service (IAAS)

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud-computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
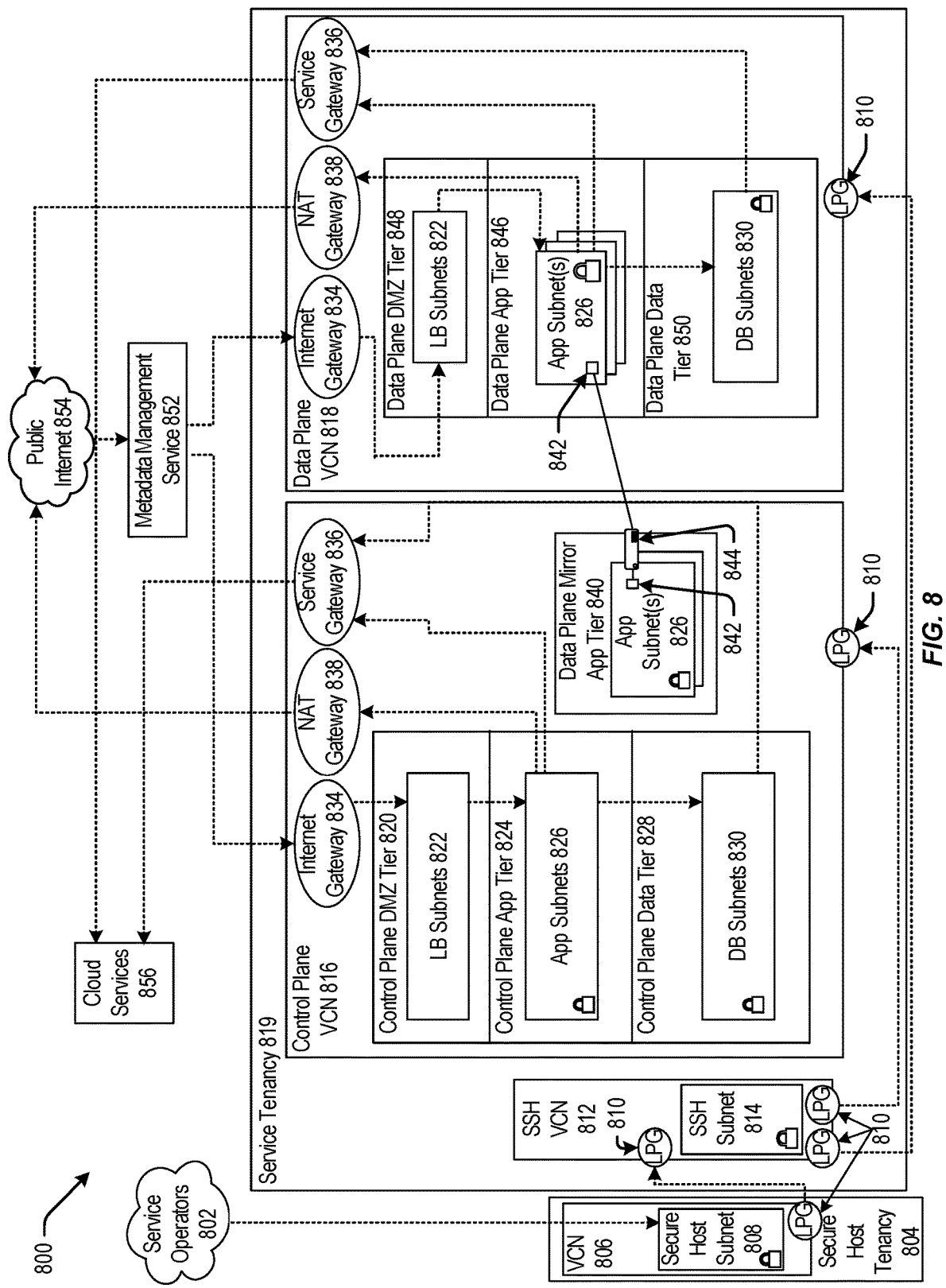
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plan VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
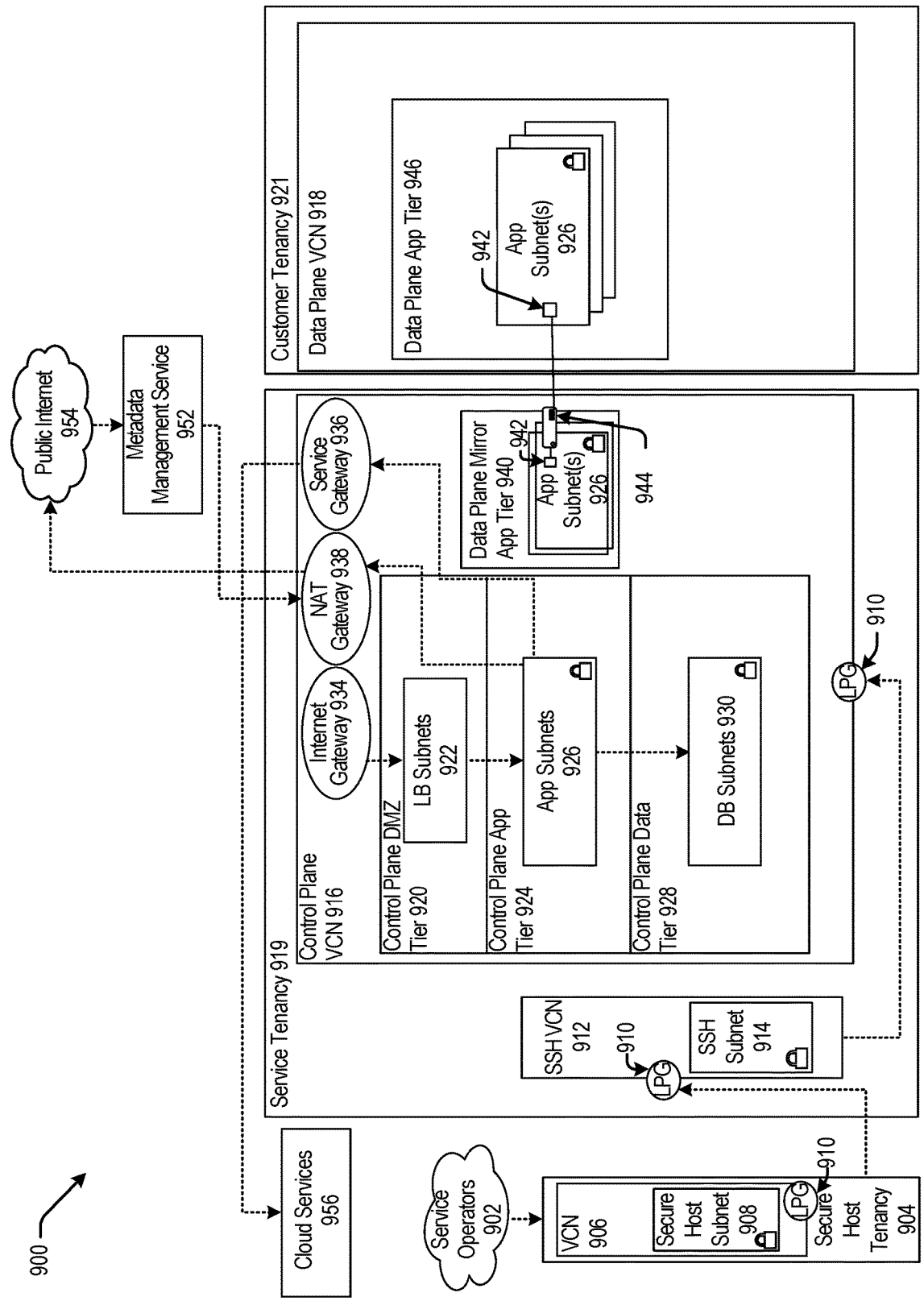
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 6) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plan app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8).

Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, which are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 6," may be located in Region 1 and in "Region 2." If a call to Deployment 6 is made by the service gateway 936 contained in the control plane VCN 916 located in Region 1, the call may be transmitted to Deployment 6 in Region 1. In this example, the control plane VCN 916, or Deployment 6 in Region 1, may not be communicatively coupled to, or otherwise in communication with, Deployment 6 in Region 2.

Figure 10:
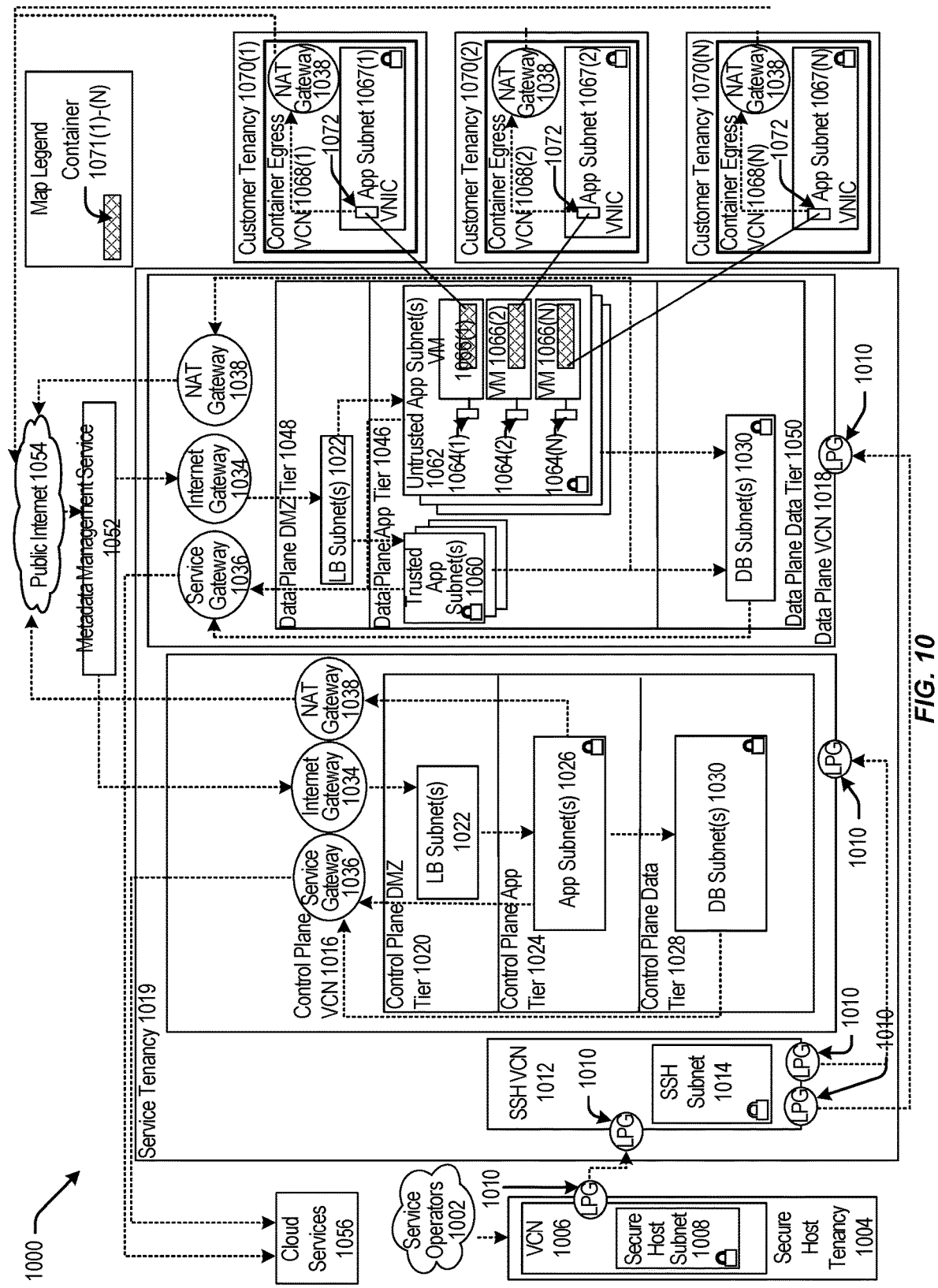
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane VCN 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 1026 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
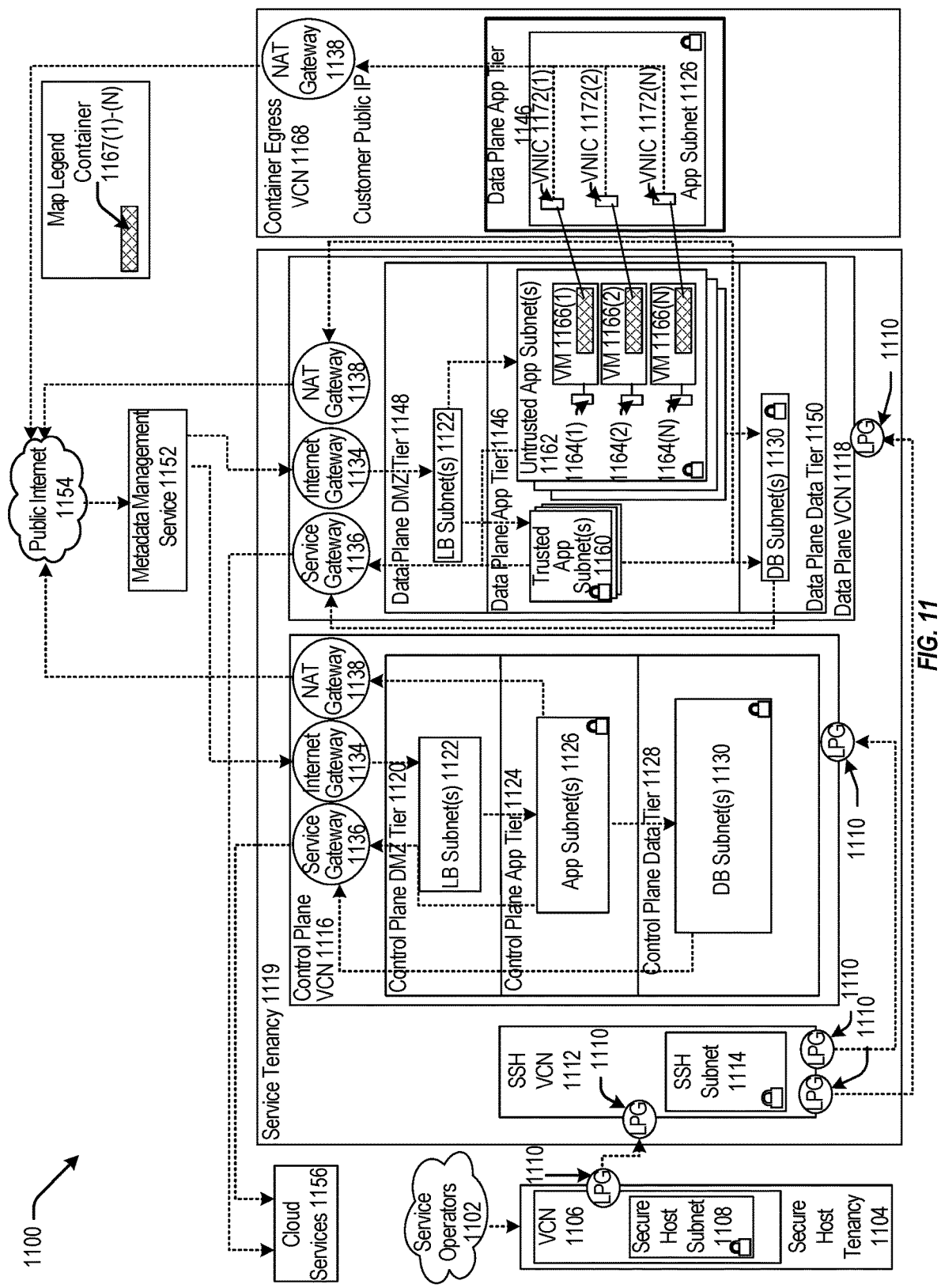
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 830 of FIG. 8). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 860 of FIG. 8) and untrusted app subnet(s) 1162 (e.g. untrusted app subnet(s) 862 of FIG. 8) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various examples of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various examples, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various examples.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The specific details of particular embodiments may be combined in any suitable manner or varied from those shown and described herein without departing from the spirit and scope of embodiments of the disclosure.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various examples and with various modifications as are suited to the particular use contemplated.

All publications, patents, and patent applications cited herein are hereby incorporated by reference in their entirety for all purposes.

What is claimed is:

1. One or more non-transitory computer-readable media comprising computer-executable instructions that, when executed by one or more processors, cause performance of operations, comprising:
   determining a first allowed container arrangement (a) comprising a first container and a second container and (b) based at least in part on a first common access permission of the first container and the second container to access a first resource of a computing network;
   assigning the first container and the second container to a first node group based at least in part on the first allowed container arrangement;
   generating, for the first node group, a first node access policy comprising a first aggregate set of permissions corresponding to:
      a first set of permissions associated with a first container access policy corresponding to the first container; and
      a second set of permissions associated with a second container access policy corresponding to the second container;
   deploying the first node group, comprising the first container and the second container, in a production environment of the computing network,
   wherein the first container and the second container access the first resource of the computing network based at least in part on the first node access policy.

2. The one or more non-transitory computer-readable media of claim 1, wherein the operations further comprise:
   determining, based at least in part on a distinct set of access permissions as between the first container and a third container, that a container arrangement comprising the first container and the third container is a forbidden container arrangement;
refraining from assigning the third container to the first node group based at least in part on the forbidden container arrangement.

3. The one or more non-transitory computer-readable media of claim 2, wherein the operations further comprise:
assigning the third container to a second node group based at least in part on the forbidden container arrangement;
generating, for the second node group, a second node access policy comprising a third set of permissions associated with a third container access policy corresponding to the third container,
wherein the third container access policy permits the third container to access a second resource of the computing network;
deploying the second node group, comprising the third container, in the production environment of the computing network,
wherein the third container accesses the second resource of the computing network based at least in part on the second node access policy.

4. The one or more non-transitory computer-readable media of claim 3, wherein the operations further comprise:
determining a second allowed container arrangement comprising the third container and a fourth container based at least in part on a second common access permission of the third container and the fourth container to access a third resource of the computing network;
assigning the third container to the second node group based at least in part on the second allowed container arrangement;
further generating, for the second node group, the second node access policy to include a second aggregate set of permissions corresponding to the third set of permissions associated with the third container access policy corresponding to the third container and a fourth set of permissions associated with a fourth container access policy corresponding to the fourth container;
deploying the fourth container to the second node group in the production environment of the computing network,
wherein the fourth container accesses the second resource of the computing network based at least in part on the second node access policy.

5. The one or more non-transitory computer-readable media of claim 4, wherein the fourth container is assigned to the second node group subsequent to the third container being deployed in the production environment of the computing network.

6. The one or more non-transitory computer-readable media of claim 4, wherein the first node group is deployed to a first compute instance, and wherein the second node group is deployed to a second compute instance.

7. The one or more non-transitory computer-readable media of claim 3, wherein the distinct set of access permissions comprises an absence of a common access permission of the first container and the third container.

8. The one or more non-transitory computer-readable media of claim 7, wherein the second container access policy is exclusive of permission for the second container to access the second resource.

9. The one or more non-transitory computer-readable media of claim 8, wherein the first node access policy permits access to a fourth resource, and wherein the second node access policy permits access to the fourth resource.

10. The one or more non-transitory computer-readable media of claim 1, wherein the first common access permission comprises: (a) a first permission for the first container to access the first resource in accordance with the first container access policy, and (b) a second permission for the second container to access the first resource in accordance with the second container access policy.

11. The one or more non-transitory computer-readable media of claim 1, wherein the first aggregate set of permissions comprises a minimum set of permissions for the first node group.

12. The one or more non-transitory computer-readable media of claim 1, wherein the first container access policy represents a first maximum set of permissions of the first container, and wherein the second container access policy represents a second maximum set of permissions of the second container.

13. A method, comprising:
determining a first allowed container arrangement comprising a first container and a second container based at least in part on a first common access permission of the first container and the second container to access a first resource of a computing network;
assigning the first container and the second container to a first node group based at least in part on the first allowed container arrangement;
generating, for the first node group, a first node access policy comprising a first aggregate set of permissions corresponding to a first set of permissions associated with a first container access policy corresponding to the first container and a second set of permissions associated with a second container access policy corresponding to the second container;
deploying the first node group, comprising the first container and the second container, in a production environment of the computing network,
wherein the first container and the second container access the first resource of the computing network based at least in part on the first node access policy;
wherein the method is performed by at least one device including a hardware processor.

14. The method of claim 13, further comprising:
determining a forbidden container arrangement comprising the first container and a third container based at least in part on a distinct set of access permissions as between the first container and the third container;
refraining from assigning the third container to the first node group based at least in part on the forbidden container arrangement.

15. The method of claim 14, further comprising:
assigning the third container to a second node group based at least in part on the forbidden container arrangement;
generating, for the second node group, a second node access policy comprising a third set of permissions associated with a third container access policy corresponding to the third container,
wherein the third container access policy permits the third container to access a second resource of the computing network;
deploying the second node group, comprising the third container, in the production environment of the computing network,
wherein the third container accesses the second resource of the computing network based at least in part on the second node access policy.

16. The method of claim 15, further comprising:
  determining a second allowed container arrangement comprising the third container and a fourth container based at least in part on a second common access permission of the third container and the fourth container to access a third resource of the computing network;
  assigning the third container to the second node group based at least in part on the second allowed container arrangement;
  further generating, for the second node group, the second node access policy to include a second aggregate set of permissions corresponding to the third set of permissions associated with the third container access policy corresponding to the third container and a fourth set of permissions associated with a fourth container access policy corresponding to the fourth container;
  deploying the fourth container to the second node group in the production environment of the computing network,
    wherein the fourth container accesses the second resource of the computing network based at least in part on the second node access policy.

17. The method of claim 16, wherein the fourth container is assigned to the second node group subsequent to the third container being deployed in the production environment of the computing network.

18. The method of claim 16, wherein the first node group is deployed to a first compute instance, and wherein the second node group is deployed to a second compute instance.

19. The method of claim 16, further comprising: wherein the first node access policy permits access to a fourth resource, and wherein the second node access policy permits access to the fourth resource.

20. A system, comprising:
  at least one hardware processor;
  wherein the system is configured to execute operations, using the at least one hardware processor, the operations comprising:
    determining a first allowed container arrangement comprising a first container and a second container based at least in part on a first common access permission of the first container and the second container to access a first resource of a computing network;
    assigning the first container and the second container to a first node group based at least in part on the first allowed container arrangement;
    generating, for the first node group, a first node access policy comprising a second aggregate set of permissions corresponding to a first set of permissions associated with a first container access policy corresponding to the first container and a second set of permissions associated with a second container access policy corresponding to the second container;
    deploying the first node group, comprising the first container and the second container, in a production environment of the computing network,
      wherein the first container and the second container access the first resource of the computing network based at least in part on the first node access policy.

\* \* \* \* \*